United States Patent [19]
Ozbutun et al.

[11] Patent Number: 6,141,656
[45] Date of Patent: Oct. 31, 2000

[54] QUERY PROCESSING USING COMPRESSED BITMAPS

[75] Inventors: Cetin Ozbutun, San Carlos; Jeffrey I. Cohen, Sunnyvale; Michael Depledge, San Jose; Julian Hyde; Hakan Jakobsson, both of San Francisco; Mark Kremer, Sunnyvale; Quoc Tai Tran, Redwood Shores, all of Calif.

[73] Assignee: Oracle Corporation, Redwood Shores, Calif.

[21] Appl. No.: 08/807,429

[22] Filed: Feb. 28, 1997

(Under 37 CFR 1.47)

[51] Int. Cl.$^7$ ...................................................... G06F 17/30
[52] U.S. Cl. ..................................... 707/3; 707/4; 707/10; 707/100; 707/101
[58] Field of Search ........................... 707/3, 4, 10, 100, 707/101

[56] References Cited

U.S. PATENT DOCUMENTS

| | | | |
|---|---|---|---|
| 4,606,002 | 8/1986 | Waisman et al. | 707/3 |
| 4,817,036 | 3/1989 | Millett et al. | 707/1 |
| 5,430,869 | 7/1995 | Ishak et al. | 707/101 |
| 5,475,837 | 12/1995 | Ishak et al. | 707/101 |
| 5,495,608 | 2/1996 | Antoshenkov | 707/10 |
| 5,504,889 | 4/1996 | Burgess | 707/100 |
| 5,560,007 | 9/1996 | Thai | 707/3 |
| 5,649,181 | 7/1997 | French et al. | 707/3 |
| 5,664,172 | 9/1997 | Antoshenkov | 707/4 |

FOREIGN PATENT DOCUMENTS

| | | | |
|---|---|---|---|
| 0772139 A2 | 5/1997 | European Pat. Off. | G06F 17/30 |

OTHER PUBLICATIONS

Antoshenkov, G., "Random Sampling from Pseudo–Ranked B + Trees", Proceeding of the 18th VLDB Conference, Vancouver, BC Canada, Aug. 1992, pp. 375–382.

Antoshenkov, G. et al., "Byte–Aligned Bitmap Compression", Date Compression Conference, 1995 DCC 1995 Proceedings Mar. 1995, p. 476.

Antoshenkov, G., "Dynamic Query Optimization in Rdb/VMS", Proceedings of Ninth International Conference on Data Engineering, Apr. 1993, pp. 42–52.

Eshel M. et al., "CMs File–Level Commit" IBM Technical Disclosure Bulletin, vol. 32, No. 1, Jun. 1989 pp. 266–268.

O'Neil, P. et al., "Multi–Table Joins Through Bitmapped Join Indices", SIGMOD Record, vol. 24, No. 3, Sep. 1995, pp. 8–11.

(List continued on next page.)

*Primary Examiner*—Wayne Amsbury
*Assistant Examiner*—Shahid Alam
*Attorney, Agent, or Firm*—McDermott, Will & Emery

[57] ABSTRACT

A method for performing logical operations on bitmap streams from segmented bitmaps. The logical operations include the AND, OR, and Set Minus operations. One embodiment of the invention performs the logical AND operation on a plurality of bitmap streams by searching for a set of overlapping bitmap segments. The ranges corresponding to the overlap among the overlapping bitmap segments are scanned to generate non-gap results. One embodiment of the invention performs the logical OR operation on a plurality of bitmap streams. To generate a result for a given range, only the bitmap segments overlapping the given range are ORed together. One embodiment of the invention performs a Set Minus between bitmap streams. A set minus is the ANDing of a first condition with the negation of another condition. To generate a set minus result, the ranges corresponding to the gaps in the bitmap associated with the negated condition are ignored.

28 Claims, 12 Drawing Sheets

OTHER PUBLICATIONS

Pronk, V. et al., "A Performance Analysis Of The Bit–Map Access Protocol For Shared–Medium Networks", Proceedings of International Zurich Seminar on Broadband Communications, 1998 Accessing, Transmission, Networking., Feb. 1998.

Wu, Ming–Chuan et al., "Encoded Bitmap Indexing For Data Warehouses", Proceedings of 14th International Conference on Data Engineering, Feb. 1998.

Mano, Moris, "Digital Design", 1991 Prentice–Hall, Inc., ISBN 0–13–212937–X (TK7888.3.M343 1991) p. 1017.

"Oracle TextServer3 Concepts, Version 3," Oracle Corporation (Part No. A24984–1, 1995, pp. 3–1 to 3–23).

"Oracle Textserver3 Concepts, Release 3.1," Oracle Corporation (Part No. A41697–2), 1996, pp. 3–1 to 3–29.

"SQL TextRetrieval Administrator's Guide", Version 2.0, Oracle Corporation, Rev. Jul., 1992 (Part No. 0365–20–0792).

IOUW wrap–up (vendors introduce database tools at International Oracle Users Week conference) (Client/server Connection) (Industry Trend or Event) DBMS, v8 n13, p. 112(1), Dec. 1995.

"Oracle 7.3 Focuses on Data Warehousing", Dan Richman, Computerworld, Inc., Sep. 25, 1995.

"Model 204 Architecture and Performance", Presented at $2^{nd}$ International Workshop on High Performance Transaction Systems, Patrick O'Neil, Sep. 1987.

"Faster Data Warehouses", Infoweek, Sec. "OpenLabs".

Oracle Press Releases, "Oracle 7 Release 7.3 extends Oracle's lead in Data warehousing Market", http://www.oracle.com/corporate/press/html/73w.html.; Oracle to host first developer conference; Preview new products, Jan. 30, 1996, http://www.oracle.com/corporate/press/html/odc2.html, DBMS vol. 8, n13, p. 112/OUW wrap–up.

Rennhackhamp, Martin DBMS, v9, n12, p. S12(3)Nov. 1996, DBMS Server Comparision Supplement Software Review Evaluation Oracle, Oracle7 7.3 and Universal Server.

"Communication", by Robert Sachs, for U.S. Application #08/808,429, entitled Query Processing Using Compressed Bitmaps.

"Declaration of Mark Kremer", for U.S. Application #08/808,429, entitled Query Processing using Compressed Bitmaps.

"Oracle: Oracle, HP And EMC Combines Forces To Create World's Largest Data Warehouse", by M2 Presswire, Sep. 19, 1995.

"Technology Analysis–Faster Data Warehouse–New Tools Provide High–Performance Querying Through Advanced Indexing", by H. Edelstein, Information Week, Dec. 4, 1995.

FIG. 9B

920 "First Case"

| 1 1 1 0 | 1 1 1 0 | — "Minuend"

| 0 1 0 1 | 0 1 1 0 | — "Subtrahend"

930 "Second Case"

| 0 1 0 1 | 0 1 1 0 | 0 1 0 1 | — "Minuend"
| 1 1 1 0 | 1 1 1 0 | — "Subtrahend"

| 0 1 0 1 | 0 1 1 0 | 0 1 0 1 | 0 1 1 0 | — "Minuend"
| 1 1 1 0 | 1 1 1 0 | —"Subtrahend"

| 0 1 0 1 | 0 1 1 0 | 0 1 0 1 | —"Minuend"
| 1 1 1 0 | 1 1 1 0 | 1 1 1 0 | —"Subtrahend"

950 "Third Case"

954— | 1 1 1 0 | 1 1 1 0 | —"Minuend"
952— | 1 1 1 0 | 0 0 0 1 | 1 0 1 0 | 
                    "Subtrahend"
}958

| 1 1 1 0 | 1 1 1 0 | 1 1 1 0 | — "Minuend"
| 0 1 0 1 | 0 1 1 0 | 0 1 0 1 | — "Subtrahend"

| 0 1 0 1 | 0 1 1 0 | 0 0 0 1 | 0 1 1 0 | — "Minuend"
| 0 1 0 1 | 0 1 1 0 | — "Subtrahend"

QUERY PROCESSING USING COMPRESSED BITMAPS

RELATED APPLICATIONS

The present application is related to: U.S. patent application Ser. No. 08/807,344, entitled "CREATING BITMAPS FROM MULTI-LEVEL IDENTIFIERS" now pending, filed by Cetin Ozbutun, Michael Depledge, Hakan Jakobsson, Mark Kremer, Jeffrey I. Cohen, Quoc Tai Tran, and Alexander C. Ho on the equal day herewith, the contents of which are incorporated herein by reference.

U.S. patent application Ser. No. 08/808,584, entitled "BITMAP SEGMENTATION" now pending, filed by Cetin Ozbutun, Jeffrey I. Cohen, Hakan Jakobsson, Mark Kremer, Michael Depledge, Quoc Tai Tran, Alexander C. Ho, and Julian Hyde, on the equal day herewith, the contents of which are incorporated herein by reference.

U.S. patent application Ser. No. 08/752,128, entitled "METHOD AND APPARATUS FOR PROCESSING COUNT STATEMENTS IN A DATABASE SYSTEM" now U.S. Pat. No. 5,819,256, filed by Cetin Ozbutun, Michael Depledge, Hakan Jakobsson, and Jeffrey I. Cohen, on Nov. 20, 1996, the contents of which are incorporated herein by reference.

U.S. patent application Ser. No. 08/808,097, entitled "GROUP BY AND DISTINCT SORT ELIMINATION USING COST-BASED OPTIMIZATION" U.S. Pat. No. 5,822,778, filed by Jeffrey Ira Cohen, Cetin Ozbutun, Michael Depledge, and Hakan Jakobsson, on the equal day herewith, the contents of which are incorporated herein by reference.

U.S. patent application Ser. No. 08/808,096, entitled "METHOD AND APPARATUS FOR USING INCOMPATIBLE TYPES OF INDEXES TO PROCESS A SINGLE QUERY" U.S. Pat. No. 5,903,888, filed by Jeffrey Ira Cohen, Cetin Ozbutun, Hakan Jakobsson, and Michael Depledge, on the equal day herewith, the contents of which are incorporated herein by reference.

U.S. patent application Ser. No. 08/808,094, entitled "INDEX SELECTION FOR AN INDEX ACCESS PATH" now pending, filed by Hakan Jakobsson, Michael Depledge, Cetin Ozbutun, and Jeffrey I. Cohen, on the equal day herewith, the contents of which are incorporated herein by reference.

U.S. patent application Ser. No. 08/807,451, entitled "BITMAPPED INDEXING WITH HIGH GRANULARITY LOCKING" U.S. Pat. No. 5,899,988, filed by Michael Depledge, Jeffrey I. Cohen, Hakan Jakobsson, Mark Kremer, Cetin Ozbutun, Quoc Tai Tran, and Alexander C. Ho, on the equal day herewith, the contents of which are incorporated herein by reference.

U.S. patent application Ser. No. 08/808,585, entitled "UPDATING BITMAPPED INDEXES" U.S. Pat. No. 5,884,307, filed by Michael Depledge, Hakan Jakobsson, Cetin Ozbutun, Jeffrey I. Cohen, and Quoc Tai Tran, on the equal day herewith, the contents of which are incorporated herein by reference.

U.S. patent application Ser. No. 08/808,560, entitled "BIT INDEX COMPRESSION" U.S. Pat. No. 5,907,297, filed by Jeffrey I. Cohen, Michael Depledge, Hakan Jakobsson, Mark Kremer, Cetin Ozbutin, and Quoc Tai Tran, on the equal day herewith, the contents of which are incorporated herein by reference.

U.S. patent application Ser. No. 08/808,586, entitled "COMBINING BITMAPS WITHIN A MEMORY LIMIT" now pending, filed by Cetin Ozbutun, Jeffrey I. Cohen, Michael Depledge, Julian Hyde, Hakan Jakobsson, Mark Kremer, and Quoc Tai Tran, on the equal day herewith, the contents of which are incorporated herein by reference.

FIELD OF THE INVENTION

The present invention relates to databases, and more particularly, to performing logical operations using bitmap indexes found in databases.

BACKGROUND OF THE INVENTION

Queries are used to retrieve sets of data that match certain criteria. For example, a query could be used to retrieve from a data base a set of data for every person born in California AND living in California.

A bitmap index provides an efficient and fast means of retrieving data from a database. A bitmap index is an index that includes a set of bitmaps that can be used to access data. In the context of bitmap indexes, a bitmap is a series of bits that indicate which of the records stored in the body of data satisfy a particular criteria. Each record in the body of data has a corresponding bit in the bitmap. Each bit in the bitmap serves as a flag to indicate whether the record that corresponds to the bit satisfies the criteria associated with the bitmap.

Typically, the criteria associated with a bitmap is whether the corresponding records contain a particular key value. In the bitmap for a given key value, all records that contain the key value will have their corresponding bits set to 1 while all other bits are set to 0. A collection of bitmaps for the key values that occur in the data records can be used to index the data records. In order to retrieve the data records with a given key value, the bitmap for that key value is retrieved from the index and, for each bit set to 1 in the bitmap, the corresponding data record is retrieved. The records that correspond to bits are located based on a mapping function between bit positions and data records.

When retrieving data using a bitmap index, several logical retrieval conditions may be combined using Boolean operations on the appropriate bitmaps. For example, if the data that is to be retrieved is subject to the conditions that key1=<val1> and key2=<val2> and key3=<val3>, a bitwise AND of the bitmaps for key values <val1> and <val2> and val3 can be performed to generate a bitmap that indicates the data items that match all three condition.

Unfortunately, conventional processing of Boolean operations like those above is wasteful. The whole bitmap of a key value is ANDed with the whole bitmaps of the other key values to produce the results. This wastefulness is compounded by the overhead incurred in retrieving the entire bitmaps from disk.

Conventional processing ignores inherent attributes of bitmap indexes that can be exploited for efficiency. For example, bitmaps often contain sequences of zeros. Such sequences are referred to herein as gaps. In a large database system, the gaps found in bitmap indexes are often large. An AND operation may be performed between, for example, four bitmaps. The first bitmap may contain a large gap. In order to determine the AND result corresponding to the gap, the three equally large portions of the last three bitmaps corresponding to the gap can be ignored. The last three can be ignored because the result of ANDing with zeros is always zeros. Thus ANDing whole bitmaps with whole bitmaps, when portions of many of the bitmaps can be ignored, creates unnecessary work for the computer system.

Based on the foregoing, it is clearly desirable to a provide a database system that performs logical operations on bitmaps indexes more efficiently than conventional means of performing logical operations on bitmap indexes.

SUMMARY OF THE INVENTION

A method for performing logical operations on bitmap streams from segmented bitmaps in a database bitmap index. The logical operations include the AND, OR, and Set Minus operations.

One embodiment of the invention performs the logical AND operation on a plurality of bitmap streams. The AND result corresponding to ranges covered by a gap in just one bitmap segment is always a gap. One embodiment of the invention looks for ranges not covered by a gap by searching for a set of overlapping bitmap segments. The ranges corresponding to the overlap among the overlapping bitmap segments are scanned to generate non-gap results.

One embodiment of the invention performs the logical OR operation on a plurality of bitmap streams. To generate a result for a given range, only the bitmap segments overlapping the given range are ORed together.

One embodiment of the invention performs a Set Minus between bitmap streams. A set minus is the ANDing of a first condition with the negation of another condition. When the negated condition is represented by a bitmap stream, the negated condition can be represented by the one's compliment of the bitmap stream. The one's compliment can then be ANDed with the first condition to produce the set minus result. The one's compliment converts gaps into maps with all bits set to one. Thus for ranges corresponding to the gaps in the bitmap associated with the negated condition, the bitmap associated with the negated condition is ignored.

BRIEF DESCRIPTION OF THE DRAWINGS

The present invention is illustrated by way of example, and not by way of limitation, in the figures of the accompanying drawings and in which like reference numerals refer to similar elements and in which:

FIG. 9B shows examples of overlaps in map; and

DETAILED DESCRIPTION OF THE PREFERRED EMBODIMENT

A method and apparatus for performing logical operations using bitmap indexes found in databases is described. In the following description, for the purpose of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
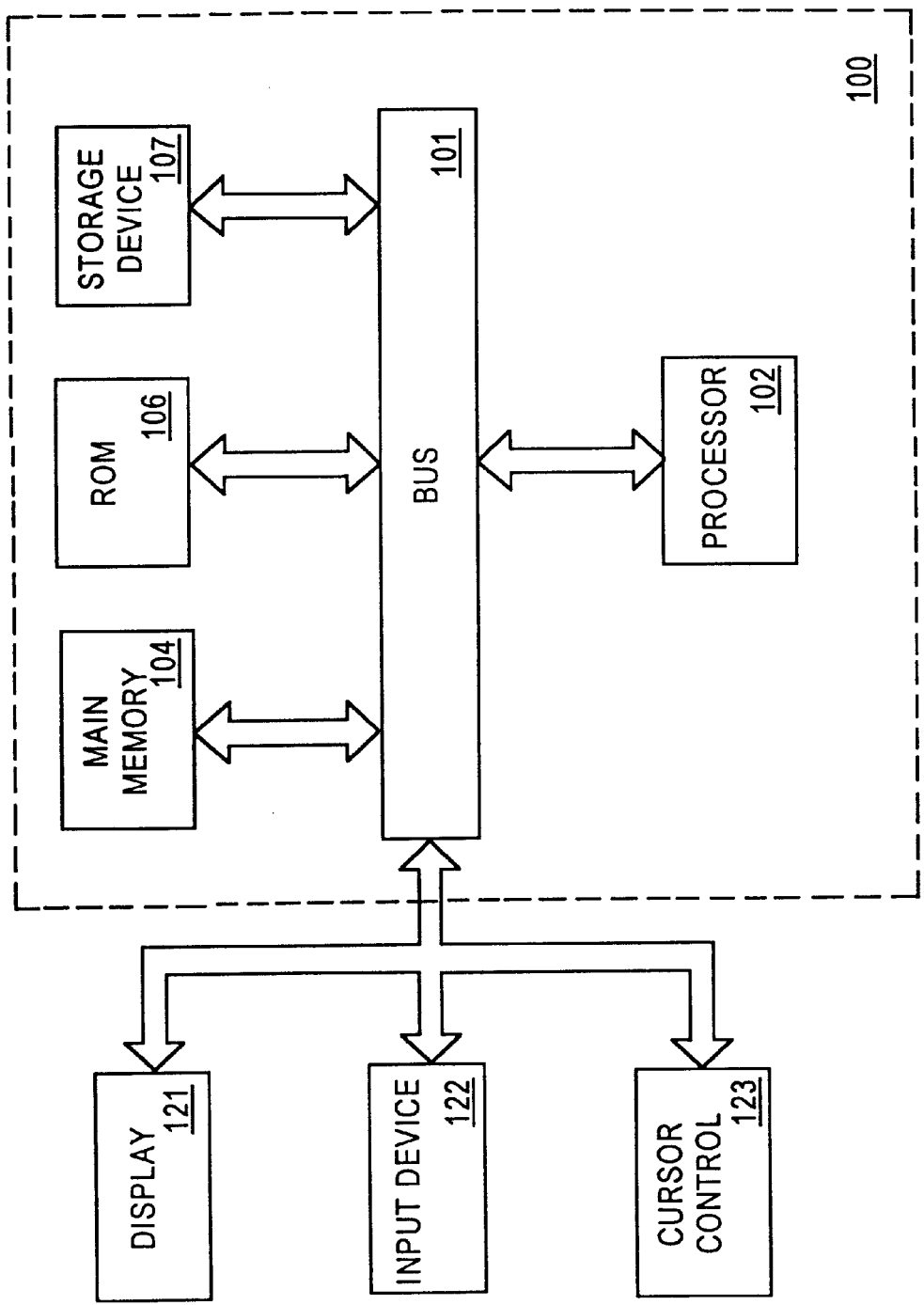
FIG. 1 is a block diagram of a computer system that may be used to implement an embodiment of the invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to perform logical operations using bitmap indexes found in databases. According to one embodiment, these operations are performed by computer system 100 in response to processor 102 executing sequences of instructions contained in memory 104. Such instructions may be read into memory 104 from another computer-readable medium, such as data storage device. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

Bitmap Streams

Figure 2:
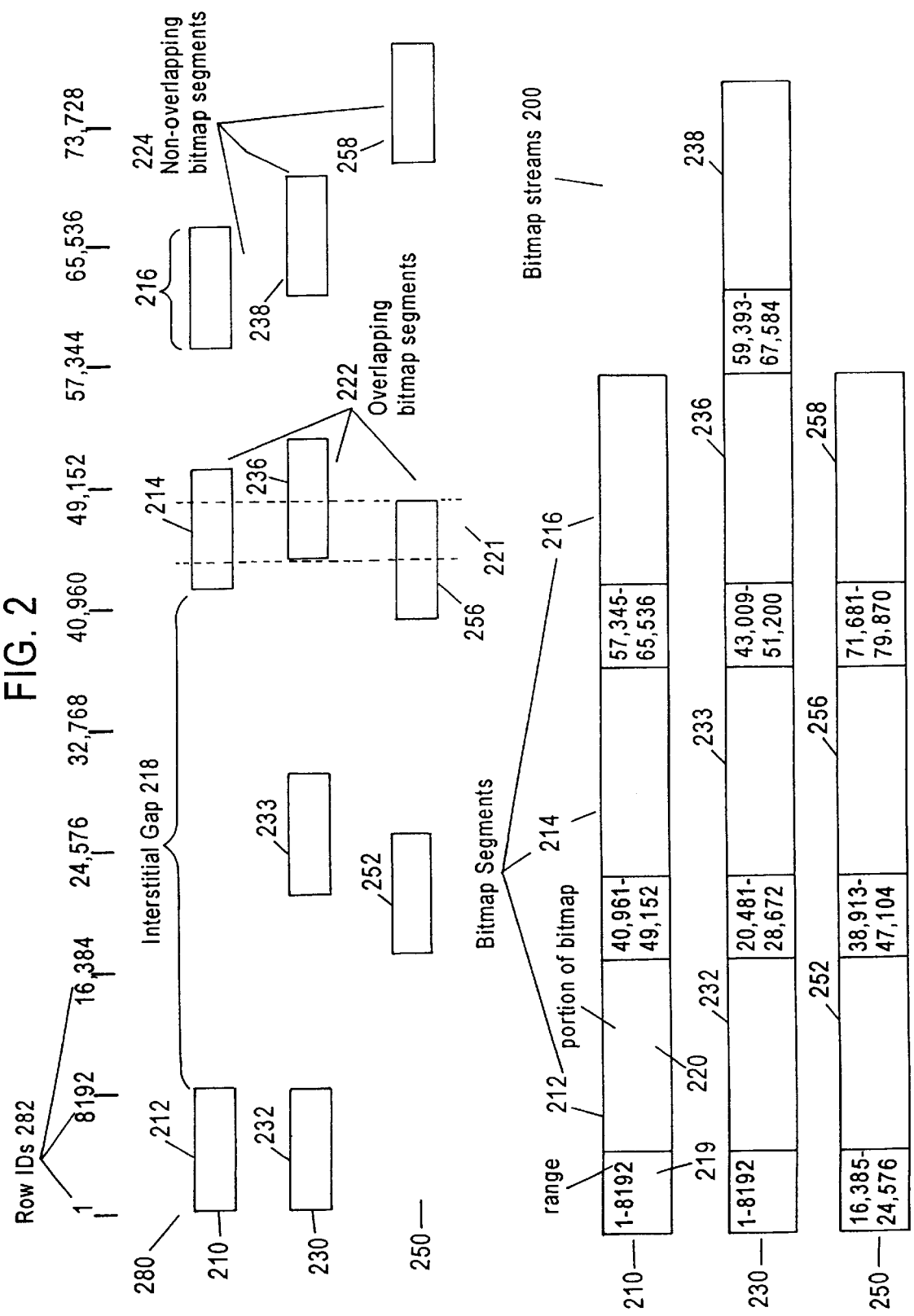
FIG. 2 shows portions of the bitmap streams being ANDed and shows the bitmap segments aligned according to row id.

An embodiment of the invention performs logical operations on bitmap streams. A bitmap stream represents a flow of data from a bitmap. According to an embodiment of the invention, a bitmap is composed of bitmap segments. A bitmap composed of bitmap segments is herein referred to as a segmented bitmap. Each bitmap segment is stored as a separated entity together with information of which range of records the bitmap segment covers. FIG. 2 shows portions exemplary bitmap streams 200 which are from a segmented bitmap. In FIG. 2, a portion of bitmap stream 210 is shown. Bitmap stream 210 includes bitmap segment 212, bitmap segment 214, and bitmap segment 216.

Bitmap segment 212 is composed of two sections. Range section 219 contains the range of the records covered by bitmap segment 212. Bitmap section 220 contains the portion of the bitmap corresponding to the range contained in range section 219. In one embodiment of an invention, the bitmap section of bitmap segments is compressed. Also shown in FIG. 2 are portions of bitmap stream 230 and bitmap stream 250. Bitmap stream 230 and bitmap stream 250 also include bitmap segments with a range section and a section.

Aligned bitmap segments 280 illustrate portions of bitmap stream 210, bitmap stream 230 and bitmap stream 250 as bitmap segments aligned according to row IDs 282. Bitmap segment 212 is shown lying within the range of row ids covered by bitmap segment 212, which are 1 through 8192. Likewise, bitmap segment 214 and bitmap segment 216 are shown lying within the range of row ids covered by them, which are, respectively, 40,961 through 49,152 and 57,345 through 65,536.

The combined ranges of bitmap segments that belong to a bitmap do not necessarily cover the entire range of records associated with the bitmap. For example, aligned bitmap segments 280 shows an uncovered range between bitmap segment 212 and bitmap segment 214. This uncovered range is herein referred to as an interstitial gap. A gap is a sequence of one or more bytes with all bits set to zero. An interstitial gap represents a gap within the ranges not covered by bitmap segments. Interstitial gap 218 represents a gap for the range between 8,193 and 40,960. As shall be explained in further detail, gaps, especially interstitial gaps, enable the quick and efficient processing of logical operations on bitmaps. An embodiment of the invention uses gaps to quickly and efficiently process the logical operations AND, OR and SET MINUS.

ANDing Bitmap Streams

Figure 3:
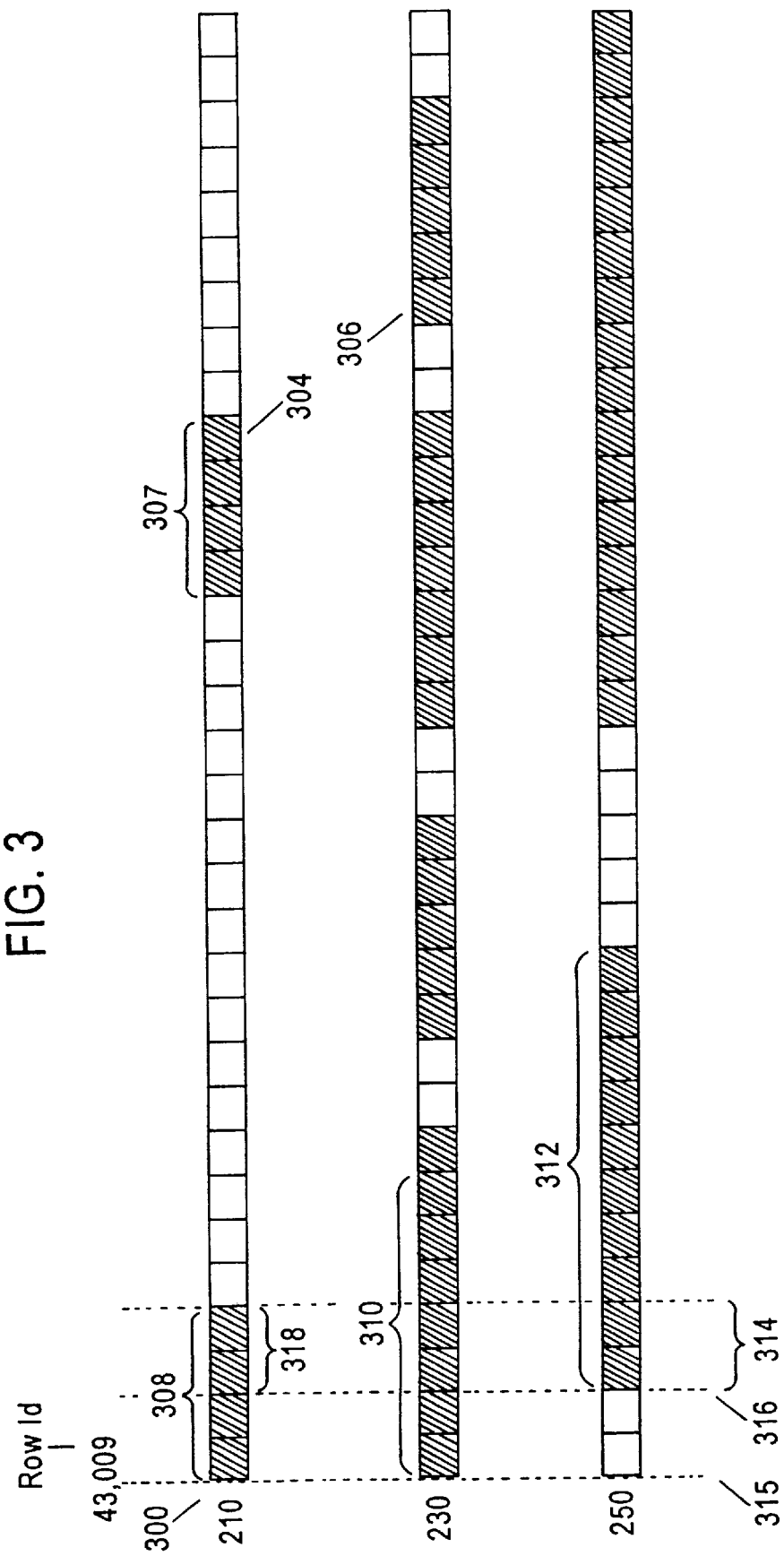
FIG. 3 shows individual bytes of bitmap segments in bitmap streams being ANDed.

The bitmap streams used to illustrate the ANDing of bitmap streams from segmented bitmaps are shown in FIG. 2 and FIG. 3. FIG. 3 shows the individual bytes for a portion bitmap stream 210, bitmap stream 230 and bitmap stream 250 for a range beginning at 43,009. Byte 304 and byte 306 are examples of bytes. An embodiment of the invention encompasses any byte size. The shaded bytes in FIG. 3 are bytes containing at least one bit set to 1. One or more contiguous bytes with at least one bit set to 1 are herein referred to as a map.

For purposes of illustration, FIGS. 2 and 3 only show 3 bitmap streams being ANDed. Alternative embodiments of the invention operate with two or more bitmap streams. Operating on multiple bitmap streams to produce a single result representing the ANDing of the bitmap streams is one aspect of this invention which enables it to achieve its efficiency.

Overlapping Bitmap Segments

An embodiment of the invention takes advantage of a few inherent characteristics of ANDing bitmap streams from segmented bitmaps. The first characteristic is that for a range corresponding to a gap in any of the single bitmap streams being ANDed, the result corresponding to that range is always a gap. The reason for this characteristic is that ANDing zero with any value always results in zero.

Another related characteristic of ANDing bitmaps is that a non-gap result can only occur in ranges not overlapped by an interstitial gap. Ranges not overlapped by interstitial gap exist only within the ranges overlapped by all the bitmap streams being ANDed.

FIG. 2 is used to illustrate these inherent characteristics. The result for the range corresponding to interstitial gap 218, is a gap even though two of the bitmap streams contain bitmap segments overlapping the range corresponding to interstitial gap 218.

To find a range in which it is possible to have a non-gap result, the bitmap segments can be searched for overlap, such as overlap 221. A set containing one bitmap segment from each bitmap stream in which all the members overlap is herein referred to as an overlapping bitmap segment.

An inherent characteristic of a set overlapping bitmap segments is that the maximum start of the ranges of the members is less than the minimum end of the members. Sets containing a member from every bitmap stream which are not sets of overlapping bitmap segments do not exhibit this characteristic. FIG. 2 illustrates this difference. In overlapping bitmap segments 222, the minimum end is contained in bitmap segment 256, which is row id 47,104. The maximum start is contained in bitmap segment 236, which is row id 43,009. Thus, for overlapping bitmap segments 222, the maximum start is less than the minimum end. In non-overlapping group 224, the minimum end is 65,536. The maximum start is 71,681, which is greater than the minimum end.

An embodiment of the invention achieves its efficiency by taking advantage of these inherent characteristics. Bitmap segments not overlapped by a bitmap segment from every bitmap stream are ignored. Only the bitmap segments in sets of overlapping bitmap segments are searched more thoroughly. An embodiment of the invention quickly finds these overlapping bitmap segments. Overlapping bitmap segments can be quickly found by examining the ranges contained in the bitmap segments to determine whether the maximum start is greater than the minimum end.

This approach is especially advantageous when the section of a bitmap segment containing a portion of the bitmap is compressed. When a bitmap segment can be ignored the overhead of decompressing a bitmap in order to search it more thoroughly is avoided.

The Overlap

Once overlapping bitmap segments are found, the overlapping bitmap segments are searched in greater detail to generate a result representing the ANDing of the bitmap streams for the range corresponding to the overlap. In generating this result, an embodiment of the invention continues to take advantage of further inherent characteristics of ANDing bitmaps. One inherent characteristic is that the result of ANDing bitmap segments for a range corresponding to any gap in any of the bitmap segments being ANDed is always a gap. A further implication of this characteristic is that a non-gap result can only occur within ranges overlapped by a map in each bitmap segment.

FIG. 3 illustrates these further inherent characteristics. Shown in FIG. 3 are map 308, map 310 and map 312 in bitmap stream 210, bitmap stream 230, and bitmap stream 250 respectively. These maps overlap over the range 314. This overlap represents a range that could possibly yield a non-gap result. A range being overlapped by a map from every bitmap stream in a set is herein referred to as alignment. A range such as range 314 represents alignment. The beginning of a range representing alignment is herein referred to as a point of alignment. A point of alignment marks the beginning of a range that could yield a non-gap result.

Point of Alignment

An embodiment of the invention generates a result by searching for points of alignment. The search begins by establishing a tentative point of alignment. The initial tentative point of alignment is the row ID corresponding to the beginning of a first map in the bitmap segment from the sparsest bitmap stream. Sparser bitmap streams have more gaps. After establishing the initial tentative point of alignment, an embodiment of the invention iterates through each of the other bitmap segments searching them one by one for a map which covers the tentative point of alignment. The bitmap segments are iterated through in an order corresponding to the sparseness of their corresponding bitmap streams.

When a bitmap segment being searched fails to yield a map which covers the tentative point of alignment, the tentative point of alignment is shifted forward to the row ID corresponding to the next map in the bit stream map being searched. The search for alignment begins again with the sparsest bitmap stream. To enhance the efficiency of searching bitmap segments, the bitmap segment that contains the map used to establish the tentative point of alignment is not searched because it obviously contains a map covering the tentative point of alignment. When every bitmap segment contains a map covering the tentative point of alignment, then alignment has been established.

Minimum Maps

Once a point of alignment is found, an embodiment of the invention searches for a minimum map. The minimum map is the smallest map beginning at the point of alignment. Point of alignment 316 in FIG. 3 represents a point of alignment. The minimum map 318 represents a minimum map because it is the smallest map beginning at point of alignment 316.

Once a minimum map is found, an embodiment of the invention then generates a result corresponding to the range of the minimum map. Each portion of each bitmap stream corresponding to the range of the minimum map is ANDed together to produce a result which may be stored in a resulting bitmap.

An embodiment of the invention achieves efficiency in several ways. By searching for alignment and limiting bitwise ANDing to the portions of the bitmap segments represented by the minimum map, an embodiment of the invention avoids the needless and costly processing of ANDing portions of the bitmap stream which cannot possibly produce a non-gap result. Second, large portions of the bitmap stream are skipped when searching for alignment by beginning each iteration of the search with the sparsest bitmap streams. When the tentative point of alignment is moved forward because a bitmap segment does not contain an overlapping map, the larger skips forward to the next map are more likely to occur in the bitmap segments from sparser bitmaps.

Steps of ANDing Bitmap Streams

Figure 4A:
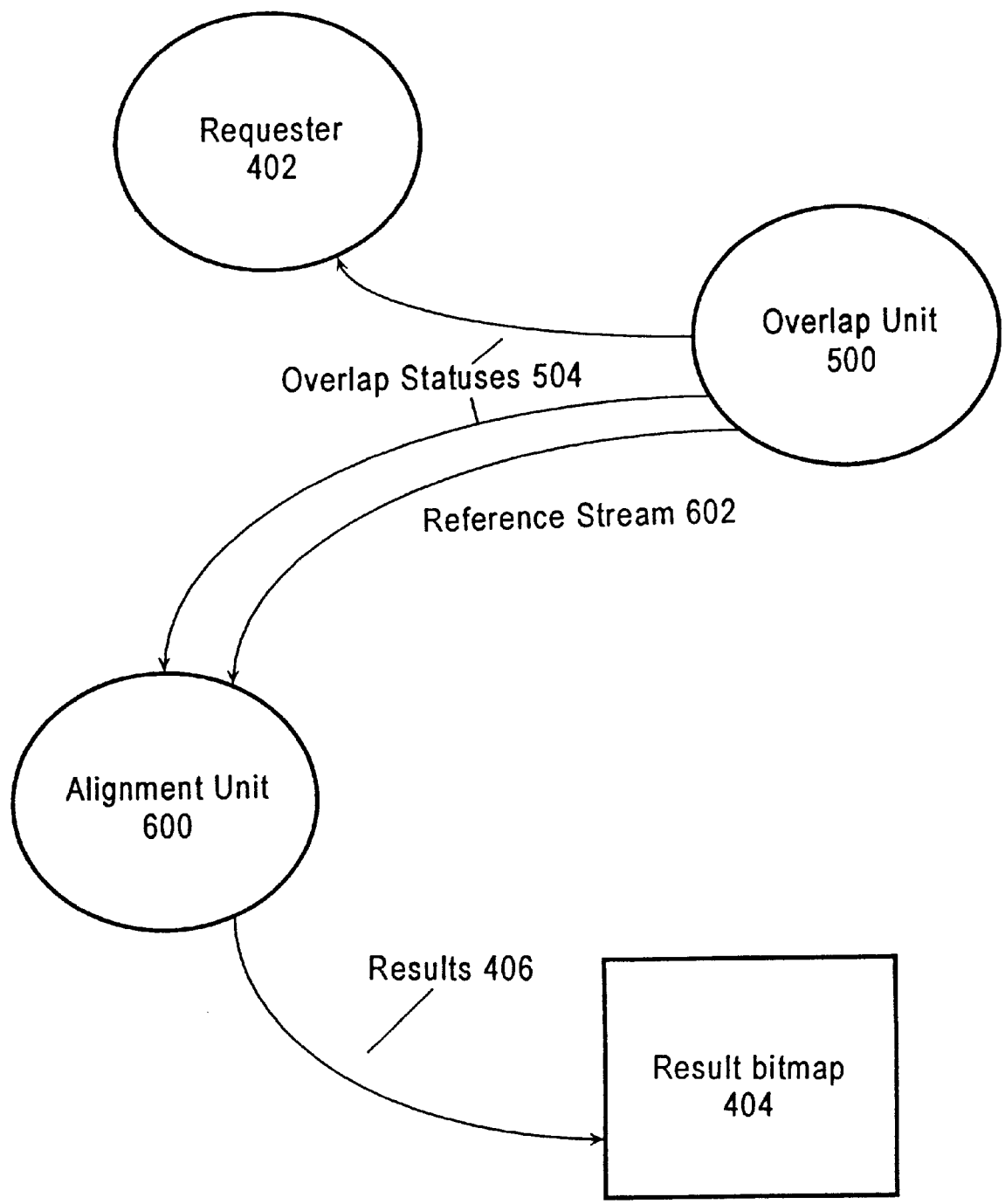
FIG. 4A depicts units on computer system executing steps of one embodiment of the invention.

FIG. 4A shows an exemplary embodiment of the invention. Requester 402, overlap unit 500, and alignment unit 600 are executing on computer system 100 in FIG. 1. Resulting bitmap 404 is used to store the results of ANDing bitmap streams. Alignment unit 600 stores results 406 in resulting bitmap 404. Overlap unit 500 executes the steps shown in FIG. 5. Alignment unit 600 executes the steps shown in FIG. 6.

As shall be explained in further detail, requester 402 invokes overlap unit 500 and alignment unit 600. Alignment unit 600 also invokes overlap unit 500. In response to being invoked overlap unit 500 searches for overlap and indicates whether any was found by transmitting overlap results 504 to requester 402 and alignment unit 600. Overlap unit also transmits reference stream 602 to alignment unit 600. Requester 402 invokes alignment unit 600. In response, alignment unit generates results 406 and stores them in resulting bitmap 404. The operation of requester 402, overlap unit 500, and alignment unit 600 shall be explained in further detail below.

In one embodiment of the invention, requester 402, overlap unit 500, and alignment unit 600 represent functions in a routine executing in computer system 100, where each may call one another. In alternate embodiments of the invention, requester 402, overlap unit 500, and alignment unit 600 may represent objects which are instances of classes in an object oriented environment, where each may invoke the methods of the other. In other embodiments, requester 402, overlap unit 500, and alignment unit 600 may be implemented in other combinations of functions, objects, procedures, or other like mechanisms.

Figure 4B:
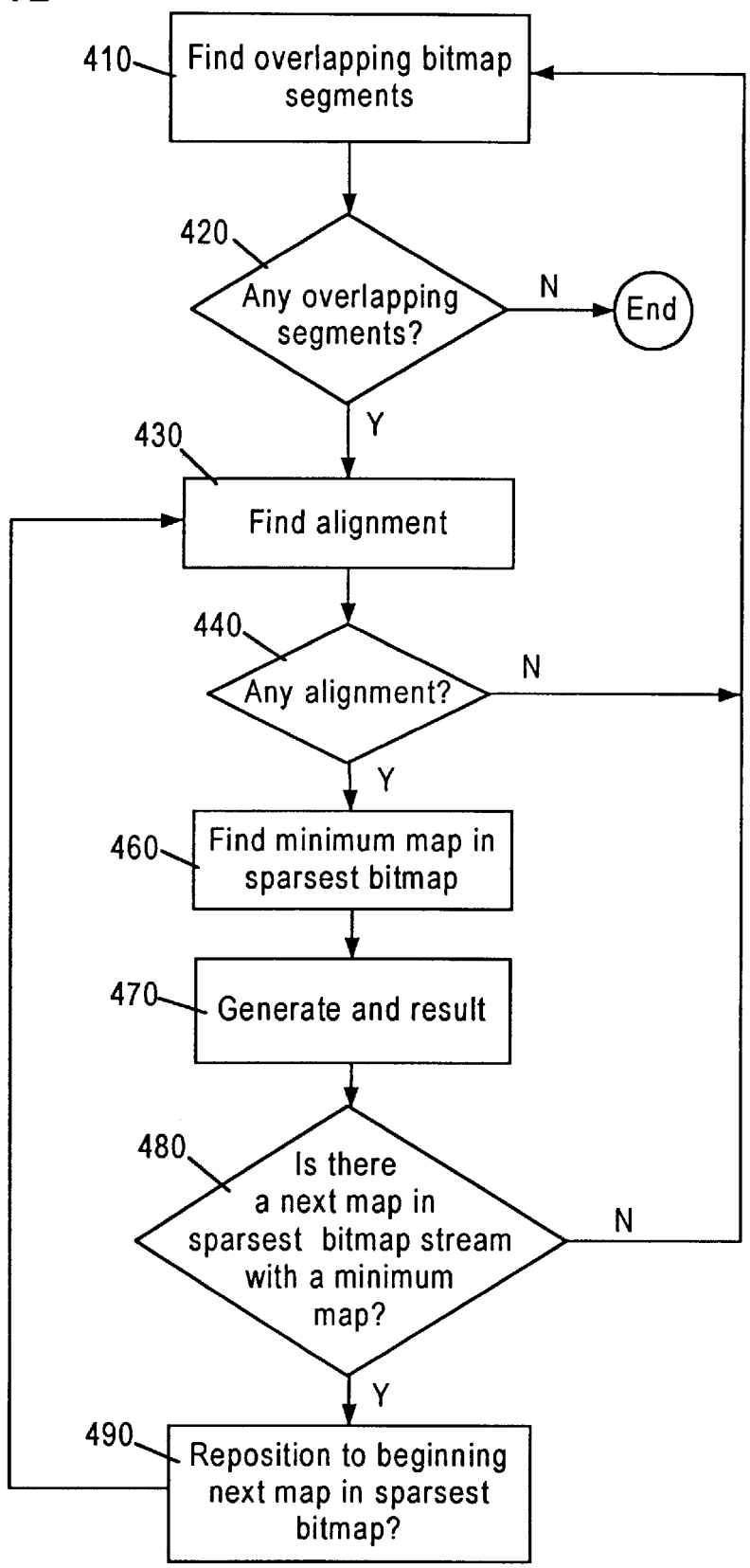
FIG. 4B is a flow chart summarizing the steps performed by an embodiment of the invention to AND bitmap streams.

FIG. 4B presents a summary flow chart of the steps performed in an embodiment of the invention. In step 410, overlap unit 500 is invoked to find a set of overlapping bitmap segments. An overlap result 504 is returned indicating whether any overlap bitmap segments were found In step 420, a determination is made of whether there are any overlapping bitmap segments in which to look for alignment. If there no overlapping bitmap segments, performance of the steps ends.

Figure 5:
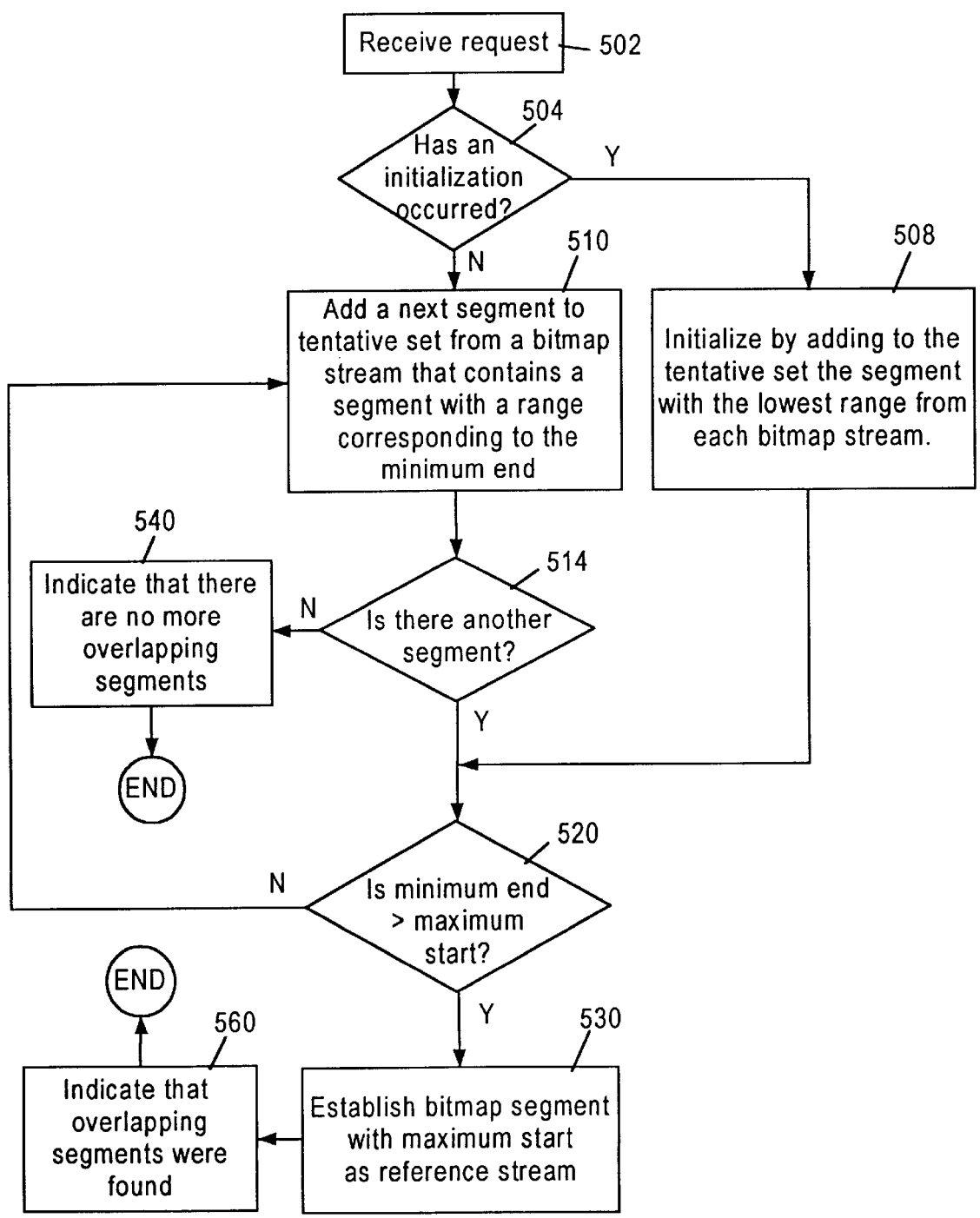
FIG. 5 is a flow chart showing the steps performed to find overlapping bitmap segments.
Figure 6:
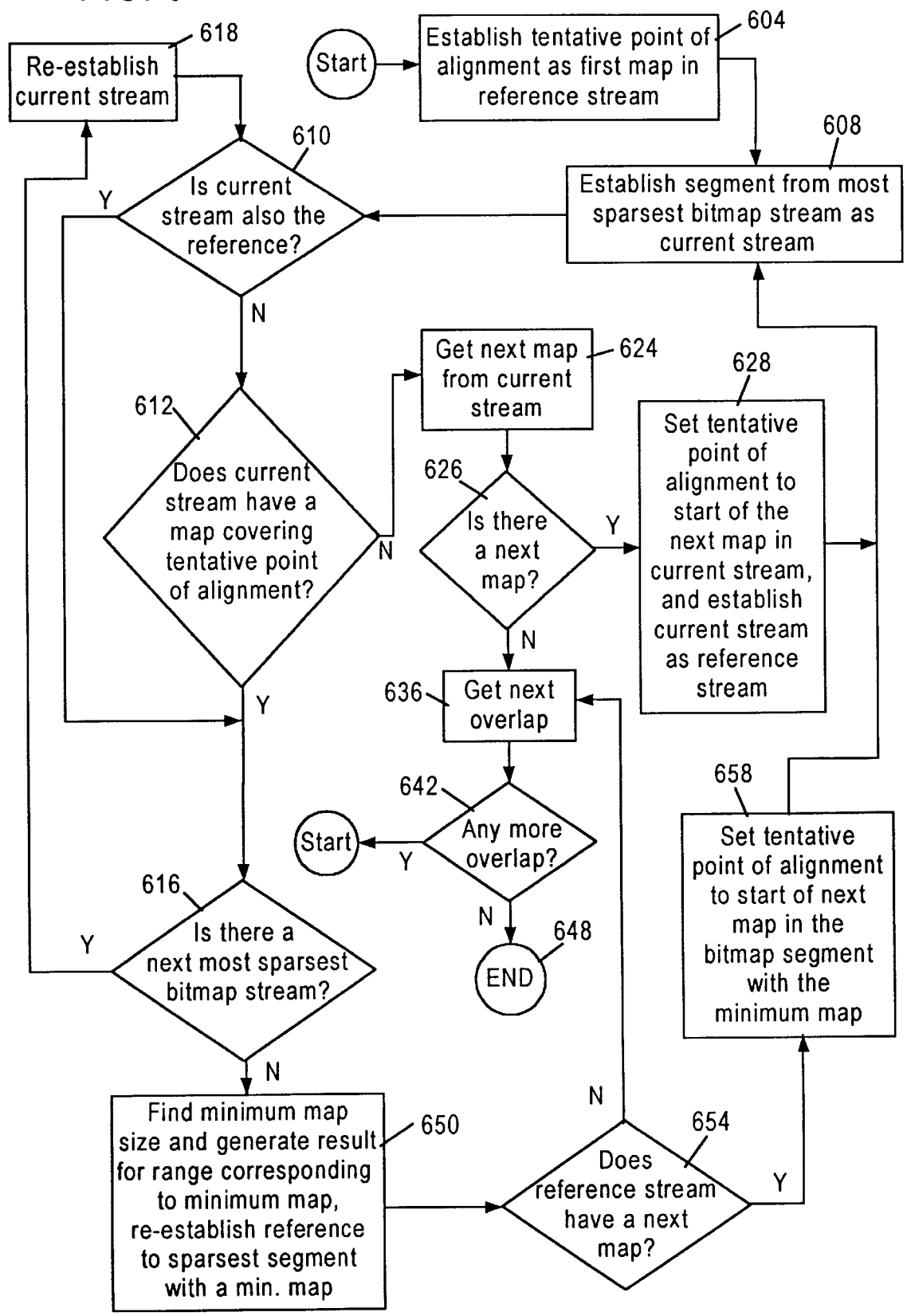
FIG. 6 is a flow chart showing the steps performed to generate an AND result based on the overlapping bitmap segments.

Steps 430 through 480 represent an overview of the steps performed in FIG. 6. The steps in FIG. 6 include the steps of FIG. 5 through invoking overlap unit 500. In step 430, an embodiment of the invention searches for a point of alignment in the bitmap. The search begins at a tentative point of alignment. In step 440, a determination is made of whether any alignment was found at the tentative point of alignment. If no alignment is found, control passes to step 410. Otherwise control passes to step 460.

In step 460, the minimum map in the sparsest bitmap is found. In step 470, a result is generated and stored in a resulting bitmap 404. In step 480, a determination is made of whether there is next map in the sparsest bitmap containing a minimum map. If there is a next map in the sparsest bitmap, control passes to step 410. In step 490, the next map is used to establish the tentative point of alignment. Control passes to step 430. The steps are repeated until the steps cease in step 420.

Finding Overlap

FIG. 5 shows the steps performed to find a set of overlapping bitmap segments in overlap unit 500. In step 502, a overlap request is received. Control passes to step 504.

In step 504, a determination is made of whether initialization of the overlap unit has occurred. In one embodiment of the invention, the reference stream is checked to see whether it is set to refer to a bitmap segment. The reference stream being set to a stream indicates that overlap unit 500 has been initialized. In alternate embodiments of the invention, other mechanisms can be used to determine whether the overlap unit has been initialized. When the unit has been initialized, control passes to step 510 to find the next set of overlapping bitmap segments. Otherwise, control passes to step 508 for initialization.

In step 508, the overlap unit is initialized by forming a tentative set of overlapping bitmap segments. The set is formed by taking from each bitmap stream the bitmap segment with the lowest range. The lowest range is defined as the range with the lowest starting row ID. After step 508, control passes to step 520.

In step 520, a determination is made of whether the minimum end of the tentative set is greater than the maximum start. If the minimum end is less than the maximum start, then a set of overlapping bitmap segments has been found. When a set of overlapping bitmap segments has not been found, control passes to step 510.

In step 510, a member of the tentative set with a range ending at the minimum end is replaced. That member is replaced by the next bitmap segment from the same bitmap stream that contains the member being replaced. There may be no next bitmap segment in the bitmap stream, in which case no bitmap segment is added to the tentative set.

Steps 510 through 520 define a loop which is the primary mechanism for finding overlap. Note the possibility that the loop may yield no overlap the first time the overlap unit is invoked. After performing step 510, control passes to step 514.

In step 514, a determination is made of whether another bitmap segment was found in step 510. If another bitmap segment was not found, control passes to step 540.

In step 540, overlap unit 500 indicates to its caller that no overlapping bitmap segments were found by transmitting an overlap result. In one embodiment of the invention, the overlap unit could be a function. The overlap result could be transmitted by setting the value of function to one of a set of values used to indicate whether any overlap was found. In other embodiments, other mechanisms can used to transmit the overlap result.

In step 514, if the determination made was that a next bitmap segment was found in step 510, then control pass to step 520.

In step 520, if the determination made is that the minimum end is greater than the maximum start, the loop defined by steps 510 through 520 is exited by passing control to step 530. In step 530, a bitmap segment starting at the maximum start is established as the reference stream.

In step 560, an overlap result is transmitted indicating that overlapping bitmap segments were found. Performance of the steps in FIG. 5 ceases. A detailed illustration of finding overlapping bitmap segments through performance of the steps in FIG. 5 shall be provided.

Finding Alignment

FIG. 6 shows the steps undertaken to generate a results based on the overlap found in the sets of overlapping bitmap segments. In step 604, the tentative point of alignment is initialized. It is initialized to the beginning of the first map in the bitmap segment used to establish the maximum start of the overlapping bitmap segments. This bitmap segment is represented by the reference stream. The reference stream is used to refer to the bitmap segment that contains the map used to establish the tentative point of alignment. Then control passes to step 608.

In step 608, the bitmap segment from the next most sparsest bitmap stream is established as the current stream. The most sparsest bitmap stream is based on a repository of data such as the one found in Oracle's Database Management System, which contains data indicating the sparseness of bit maps in bitmap indexes. After performance of step 608, control passes to step 610.

In step 610, a determination is made on whether the current stream is the same as the reference stream. If both streams are the same, then the current stream must have a map overlapping the tentative point of alignment because that map was used to establish the tentative point of alignment. Step 612 is skipped by passing control to step 616. When the current stream is not same as the reference stream, control passes to step 612.

In step 612, a determination is made as to whether or not the current stream has a map covering the tentative point of alignment. If the current stream does not contain a map covering the tentative point of alignment, then control passes to step 624.

In step 624, the next map in the current stream beginning after the tentative point of alignment is found. Note the current stream may not contain a next map. Control passes to step 626.

In step 626, a determination is made of whether a next map was found in step 624. If a next map was found, then control passes to step 628.

In step 628, the tentative point of alignment is set to the beginning of map found in step 658. The current stream is established as the reference stream. Note that the reference stream is maintained as the bitmap segment that contained the map used to establish the tentative point of alignment. Control then passes to step 608 search for alignment.

If in step 612, the determination made is that the current stream does contain a map covering the tentative point of alignment, then control passes to step 616. In step 616, a determination is made as to whether there is a next most sparsest bitmap stream. If there is a next most sparsest bitmap stream, then control passes to step 618.

In step 618, the next most sparsest bitmap segment is established as the current stream. Then control pass to 610.

Steps 610 through 618 represent a loop which terminates under two cases. The first case is that the tentative point of alignment does not represent alignment. This case is established in step 612, when it is determined that a bitmap segment does not have a map overlapping the tentative point of alignment.

In the second case, alignment has been established. This occurs when the loop defined by steps 610 through 618 iterates through all the bitmap segments and finds a map overlapping the tentative point of alignment. This case is established in step 616, when in a determination is made that there are no more sparsest bitmap streams because they have all been scanned.

Note that the search for the map representing alignment always begins with the sparsest bitmap segment. By establishing the most sparsest bitmap segment in step 608 as the current bitmap segment, the loop defined by steps 610 through 618, which represents the search for alignment, begins with the sparsest bitmap segment.

Finding the Minimum Map

In step 650, each of the bitmap segments is scanned in order of their sparseness to find the minimum map starting at the point of alignment. The reference stream is set to the sparsest bitmap segment with a map the same size as the minimum map. Once the minimum map has been found, a result is generated for the range corresponding to the minimum map. The result is created by performing bitwise ANDing of the portions of the bitmap segments corresponding to the minimum map range. A gap representing the range of row ids between the previous found minimum map and the current minimum map is prefixed to the result. In one embodiment of the invention, the gap and the result are compressed and stored in a compressed resulting bitmap. Control then passes to step 654.

In step 654, a determination is made of whether the reference stream has another map. If the reference stream does not have a minimum map, then control passes to step 636 to find the next set of overlapping bitmap segments. If the reference stream does have a minimum map, control passes to step 658.

In step 658, the tentative point of alignment is shifted forward to the start of the next map in the reference stream. Note that at this point the reference stream is the sparsest bitmap segment with a map the size of the minimum map. The sparser bitmap segments tend to generate the larger skips forward to the next map. This map is then used to establish a new tentative point of alignment. Control returns to step 608, where the search for alignment begins anew.

Finding the Next Overlapping Bitmap Segments

When in step 626 it is determined that there is no next map in a bitmap segment, the end of the overlap has been reached. The search for the next set of overlapping bitmap segments occurs in step 636.

In step 636, the steps of FIG. 5 are performed by invoking the overlap unit. In response the overlap unit finds the next set of overlapping bitmap segments and returns the overlap result. In step 642, a determination is made of whether a set of overlapping bitmap segments has been found based on the overlap result. If the overlap result indicates that the overlapping bitmap segments had been found, control passes to the start of the steps in FIG. 6. Note that in FIG. 5 the reference stream is set the bitmap segment with map representing the maximum start of the bitmap segments. Control then returns to the start of the steps in FIG. 6.

If the overlap result indicates that overlapping bitmap segments had not been found, then performance of the steps ends. The resulting bitmap now represents the result of ANDing the bitmap stream. The resulting bitmap can be used in subsequent operations, including logical operations.

Illustration of Adding Bitmap Streams

FIG. 2 and FIG. 3 contain the bitmap streams which shall be used to demonstrate the performance of the steps in FIG. 5 and FIG. 6. The first step performed would be step 502 in FIG. 5.

In step 502, an overlap request to find overlapping bitmap segments is received. In step 504, the determination made is that the reference stream has not yet been set. This indicates the need for initialization. Control then passes to step 508.

In step 508, bitmap segment 212, bitmap segment 232 and bitmap segment 252 would be added to the tentative set. These bitmap segments are the bitmap segments with the lowest range in each of their respective bitmap streams. Control passes to step 520.

In step 520, a determination is made of whether or not the minimum end of the members in the tentative set is greater than the maximum start. The minimum end would be represented by either bitmap segment 212 or bitmap segment 232. The minimum end in either of these is 8,192. Bitmap segment 252 contains the maximum start, which is 16,385. Because the minimum end is not greater than the maximum start, the next step is step 510.

In step 510, the bitmap segment to add to the tentative can be found in either the bitmap stream containing bitmap segment 212 or the bitmap stream containing bitmap segment 232 because both of these bitmap segments end at the minimum end. Bitmap segment 212 is the one removed from the tentative set and bitmap segment 214 is added to the tentative set. Control passes to step 514.

In step 514, the determination made is that another bitmap segment was found in step 510. To facilitate illustration of the steps, step 514 will not be illustrated in detail unless further illustration in detail is significant to illustration of the steps. Control then passes to step 520.

The next step is step 520. Again a determination is made of whether the minimum end is greater than the maximum start. The minimum end is still represented by bitmap segment 232. Because the minimum end is not greater than the maximum start, control passes to step 510. In step 510, the bitmap segment with the minimum end, bitmap segment 232, is replaced with the bitmap segment with the next lowest range from the same bitmap stream that had contained bitmap segment 232. The bitmap segment with the next lowest range in bitmap stream 230 is bitmap segment 233. Control then passes to step 514 and then to step 520. In step 520, a determination is made of whether or not the minimum end is greater than the maximum start. Bitmap segment 252 contains the minimum end, which is 24,576. Bitmap segment 214 contains the maximum start, which is 40,961. Because the minimum end, 24,576, is not greater than the maximum start, 40,961, control passes to step 510. In step 510, bitmap segment 252 is replaced by bitmap segment 256 as a member of the tentative set. Control passes to step 514 and then to step 510. In step 510, it is again determined that the minimum end is not greater than the maximum start. Control passes to step 510, where bitmap segment 232 is replaced by bitmap segment 236 as a member of the tentative set.

In step 520, a determination is made of whether the minimum end is greater than the maximum start. Bitmap segment 256 contains the minimum end, which is 47,104. Bitmap segment 236 contains the maximum start, which is 43,009. The minimum end is greater than the maximum start. This state represents that a set of overlapping bitmap segments has been found and that a range represented by overlap 220 may contain a non-gap result. Control passes to step 530.

In step 530, bitmap segment 236 is established as the reference stream because it contains the maximum start. In step 560, an overlap result indicating that a set of overlapping bitmap segments has been found is transmitted.

The alignment unit is then invoked to generate the resulting bitmap 404. The steps performed to generate the resulting bitmap are shown in FIG. 6.

In step 604, the beginning of map 310 is established as the tentative point of alignment 315. Map 310 is the first map in the reference stream, which is bitmap segment 236. Control then passes to step 608.

In step 608, bitmap segment 214, the bitmap segment from the most sparsest bitmap stream, is established as the current stream. Control then passes to step 610. In step 610, the determination is made is that the current stream, bitmap segment 214, is not the reference stream, bitmap segment 236. Control then passes to step 612.

In step 612, a determination is made of whether the current stream, bitmap segment 214, contains a map covering the tentative point of alignment 315. Map 308 in bitmap segment 214 does overlap the tentative point of alignment, therefore control passes to step 616.

In step 616, the determination made is that there is a next most sparsest bitmap stream, so control passes to step 618. In step 618, the bitmap segment 236, which is from the next most sparsest bitmap stream, bitmap stream 230, is established as the current stream. Control then passes to step 610.

In step 610, the determination made is that the current stream is the reference stream, bitmap segment 236. So control pass to step 616.

In step 616, the determination made is that there is a next most sparsest bitmap stream, bitmap stream 250. Control passes to step 618. In step 618, the bitmap segment in the next most sparsest bitmap stream, bitmap segment 256, is established as the current stream. Control then passes to step 610.

In step 610, the determination made is that the current stream, bitmap segment 256, is not the reference stream, bitmap segment 236. Control then passes to step 612. In step 612, the determination made is that the current stream, bitmap segment 256, does not contain a map overlapping the tentative point of alignment 315. Control then passes to step 624.

In step 624, a next map is found in the current stream, map 312 in bitmap segment 236. In step 626, the determination made is that a next map was found. Control then passes to step 628.

In step 628, the tentative point of alignment is shifted forward to the next map in the current stream, bitmap segment 256. The tentative point of alignment is set to the tentative point of alignment 316, the beginning of the map 312. Bitmap segment 236 is established as the reference stream. Control passes to step 608.

In step 608, bitmap segment 214, the bitmap segment from the most sparsest bitmap stream, is established as the current stream. Control then passes to step 610. In step 610, the determination made is that the current stream, bitmap segment 214, is not the reference stream, bitmap segment 256. Control then passes to step 612.

In step 612, a determination is made of whether the current stream, bitmap segment 214, contains a map that overlaps the tentative point of alignment 316. Map 308 in bitmap segment 214 does overlap the tentative point of alignment 316, therefore control passes to step 616.

In step 616, the determination made is that there is a next most sparsest bitmap stream, so control passes to step 618.

In step 618, bitmap segment 236, which is in the next most sparsest bitmap stream, bitmap stream 230, is established as the current stream. Control then passes to step 610.

In step 610, the determination made is that the current stream is not the reference stream, bitmap segment 236. So control pass to step 616. So control passes to step 612. In step 612 the determination made is that bitmap segment 236 contains a map, map 310, which overlaps the tentative point of alignment 316. Control passes to step 616.

In step 616, the determination made is that there is a next most sparsest bitmap stream, so control passes to step 618. In step 618, the bitmap segment in the next most sparsest bitmap stream, bitmap segment 256, is established as the current stream. Control then passes to step 610.

In step 610, the determination made is that the current stream, bitmap segment 256, is the reference stream. Control then passes to step 616.

In step 616, the determination made is that there is no next sparsest bitmap segment, so control pass to step 650 for generation of results.

In step 650, each bitmap segment is searched for the minimum map. The minimum map would be the map in map 308 beginning at tentative point of alignment 316. Map 308 is the minimum map because from the point of alignment 316, map 308 contains the smallest map of all of the maps in the bitmap segments. The reference segment is also set to bitmap segment 214, because it is the sparsest bitmap segment containing a map corresponding to the minimum map.

A result representing the bitwise ANDing of the bitmap streams for the range corresponding to the minimum map is generated and stored in a resulting bitmap. A gap representing the range before the minimum map is prefixed to the result. Control then passes to step 654.

In step 654, the determination made is that the reference stream, bitmap segment 214, has a next map, map 307. Control passes to step 658. In step 658, the tentative point of alignment is set to the beginning of the next map in the reference stream, map 307.

The steps 608 through 618 are repeated until in step 624, a map is not found in a current stream. Control passes to step 626. In step 626, the determination made is that a next map was not found in step 624. Control passes to step 636, where the overlap unit is invoked.

For the purposes of illustration, the bitmap segments shown in FIG. 2 are the only bitmap segments in the bitmap streams 280. In FIG. 5, a request is received to find overlapping bitmap segments. In step 504, the determination made is that the reference has been set, so initialization has occurred. Control then passes to step 510.

In step 510, a bitmap segment following the bitmap segment establishing the minimum end of the overlapping bitmap segments is replaced with the bitmap segment with the next lowest range from the same bitmap stream that had contained the bitmap segment establishing the minimum end. The bitmap segment establishing the minimum end is bitmap segment 256. The bitmap segment following bitmap segment 256 is bitmap segment 258. Bitmap segment 258 is added to the tentative set. Control passes to step 514, then step 520.

In step 520, a determination is made of whether the minimum end is greater than the maximum start. The minimum end is in bitmap segment 214 and the maximum start is in bitmap segment 258. Because the minimum end 49,152 is not greater than the maximum start, 71,681, control passes to step 510. In step 510, the bitmap segment with the minimum end, bitmap segment 214, is replaced with the bitmap segment with the next lowest range from the same bitmap stream that contains bitmap segment 214. The bitmap segment with the next lowest range in bitmap stream 210 is bitmap segment 216. Control then passes to step 514 and then to step 520. In step 520, a determination is made of whether or not the minimum end is greater than the maximum start. Bitmap segment 236 contains the minimum end, which is 51,200. Bitmap segment 258 contains the maximum start, which is 71,681. Because the minimum end, 51,200, is not greater than the maximum start, 71,681, control passes to step is 510. In step 510, bitmap segment 236 is replaced by bitmap segment 238 as a member of the tentative set. Control passes to step 514 and then to step 510. In step 514, it is again determined that the minimum end is not greater than the maximum start. Control then passes to step 510.

In step 510, the bitmap segment establishing the minimum end is bitmap segment 216. No bitmap segment follows bitmap segment 216 in the same bitmap stream. So no bitmap segment is added to the tentative set. Control passes to step 514.

In step 514, the determination made is the no bitmap segment is left in bitmap stream 210, control then passes to step 540. In step 540, an overlap result indicating that no overlapping bitmap segment was found is transmitted to the alignment unit 600. Control passes to step 642.

In step 642, the determination made is that there is no more overlap. Performance of the steps ends. Resulting bitmap 404 can be used in subsequent operations, including logical operations.

ORing Bitmap Streams

Unlike ANDing, ORing a zero with anything does not necessarily result in zero. Thus a gap in one bitmap stream does not permit ignoring the other bitmap streams. Nevertheless, there are inherent characteristics of ORing bitmaps taken to advantage by an embodiment of the invention.

Exemplary Bitmap Streams and Data Structure for ORing

Figure 7:
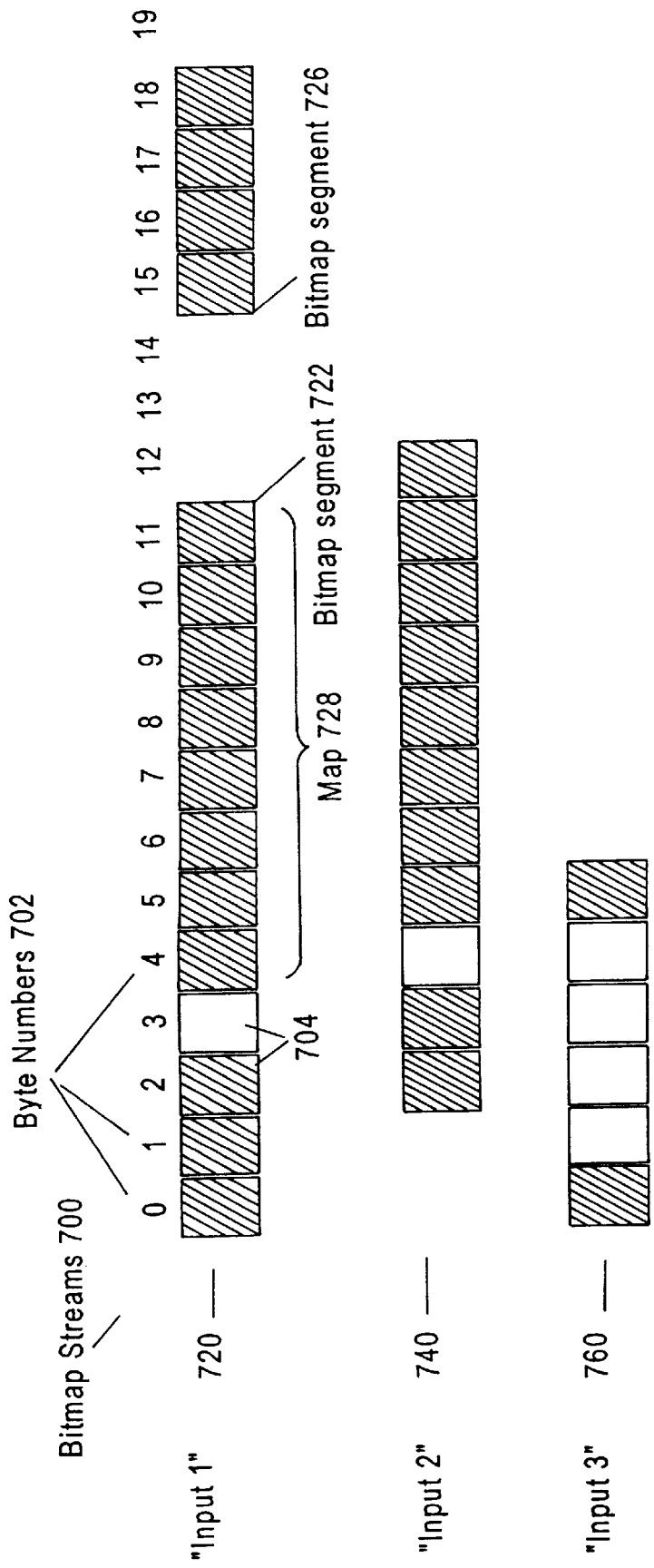
FIG. 7 shows bitmap segments for bitmap streams being ORed, and shows the aligned set and the ordered heap.

FIG. 7 shows maps in input streams 700 which includes input stream 720, input stream 740, and input stream 760 in byte aligned form. These represent bitmap streams being ORed. The bitmap streams being ORed are herein referred to as input streams. Exemplary bytes 704 bytes are contained in the bitmap section of bitmap segment 722. Bitmap segment 726 follows bitmap segment 722 in input stream 720. Only the bitmap sections of the bitmap segments in FIG. 7 are shown. Input stream 740 and input stream 760 is depicted in the same manner as input stream 720. Map 728 is shown as an hashed area. All other maps shown in FIG. 7 are depicted in the same manner.

Each byte is associated with a range of row ids within their respective bitmap sections. For purposes of illustration, each position of each byte in FIG. 7 is associated with a byte number in byte numbers 702. The byte number is associated with the range of row ids of the byte corresponding to the byte number. The bytes in FIG. 7 are shown aligned according to the byte number.

For purposes of illustration, FIGS. 7 only shows 3 bitmap streams being ORed. Alternative embodiments of the invention operate with two or more bitmap streams. Operating on multiple bitmap streams to produce a single result representing the ORing of the bitmap streams is one aspect of this invention which enables it to achieve its efficiency.

Generating ORing Resulting Bitmap

One inherent characteristic of ORing segmented bitmaps is that for the ranges in which no bitmap segments overlaps, the result is a gap. The bytes position 13 through 14 represent such a range with no overlapping bitmap segments. Another inherent characteristic is that for a given range, only bytes which are not gaps which overlap a range must be ORed to generate the result representing the ORing of the bitmap streams for that given range. Byte position 0 is an example of such a range. Only the bytes corresponding to byte number 1 in input stream 760 and input stream 720 must be ORed.

Aligned Sets

An aligned set is associated with a byte position. Maps from input streams with bytes overlapping the byte position are members of the aligned set. For example, if the byte position of the aligned set is byte position 0, the members of the aligned set are the maps in input stream 720 starting as position 0, and the map starting at position 0 in input stream 760.

An aligned set is associated with an upper bound. The upper bound represents the next byte number after the byte position overlapped by a map from the input streams. No other map outside the aligned set is needed to generate the OR for the range starting at the byte position and ending before the upper bound. Thus for the range starting at the byte position and ending immediately before the upper bound, the only maps needed to generate an ORing result representative for that range are the members of the aligned set. For example, for the range beginning with byte position 0 and ending at byte position 1, the only maps needed to generate the OR result are the maps in input stream 720 and input stream 760 beginning at byte number 0. The next map not in the aligned set is the one starting at byte number 2 in bitmap stream 740. So byte number 2 would be the upper bound.

Once an aligned set is established, an embodiment of the invention iterates through each byte number up to the upper bound ORing the bytes in the maps corresponding to the byte number. When it reaches the last byte of a member map in the aligned set, that member is removed as a member of the aligned set before the next iteration. When an embodiment of the invention iterates up to the upper bound, the maps from the input streams that begin at the upper bound are added to the aligned set. By removing members which no longer overlap a byte position, and adding only those maps that do overlap a byte position, the aligned only retains and acquires only the maps needed to generate the OR result for the range corresponding to the byte position. Limiting the ORing to the members of the aligned is one aspect of one embodiment of the invention that enables it to achieves it efficiency.

Ordered Heap

The ordered heap is an approach used by one embodiment of the invention to establish and maintain the upper bound and identify the maps to add to the aligned set when an upper bound is reached. The advantages of the ordered heap can be illustrated by contrasting it to a conventional approach.

One conventional approach to establishing and maintaining the upper bound and identify the maps to add to the aligned set is to establish a list of references to the next map in each input stream. After establishing the aligned set, the references would be set to the next map in each input stream following the aligned sets. To determine the upper bound each reference could be scanned to find the next map, which would be the map overlapping the byte number closest to the byte position of the aligned set. Then a reference to the upper bound would be established.

When the aligned set reaches the upper bound, it would iterate through the references performing a set of operations. Each reference would be scanned to determine whether its map began at the upper bound. The maps that do begin at the upper bound would be moved into the aligned set. Then these references would be changed to the next map in the corresponding input stream. As the references in the list are iterated, the new upper bound could be established.

An ordered heap is binary data structure. Member references to the next map in each input would be maintained in the binary tree using the starting byte number of the map as the key. The next map among all the input streams entry would then represented be the logical top of tree. Inserting the next map from the input stream into the ordered heap would take order log n set of operations.

For a small number of input streams, the conventional method would be comparably efficient to the ordered heap. For example, if the number of inputs were 3 the conventional method would require three sets of operations, while the ordered heap would require log 3. For greater numbers such as 8, the conventional method would require 8, while the heap would require on log 8. As the number of inputs increase the ordered heap becomes comparably more efficient.

Steps of ORing Bitmap Streams

Figure 8:
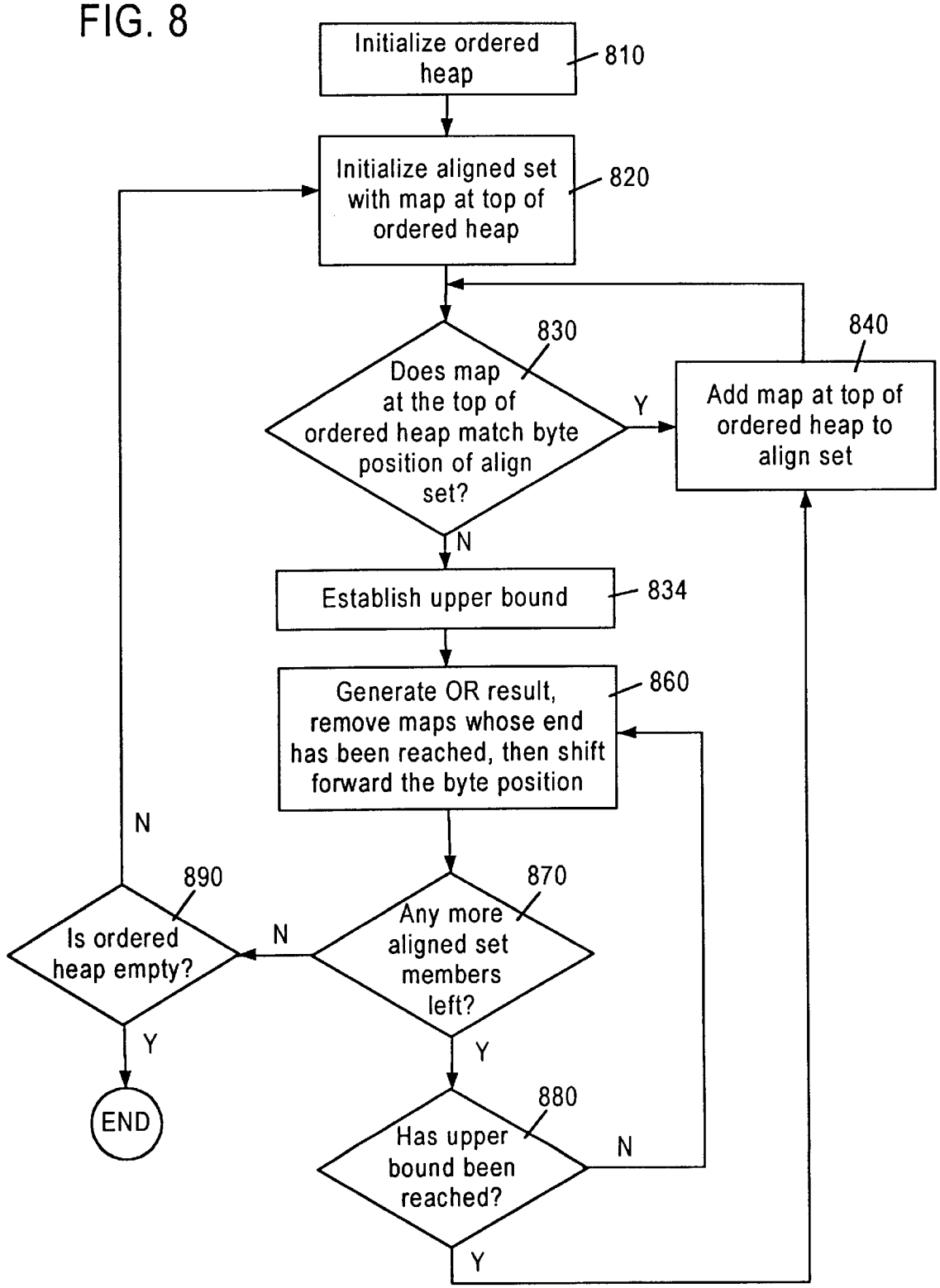
FIG. 8 is a flow chart showing the steps performed to OR bitmap streams.

FIG. 8 is a flow chart showing the steps of an embodiment of the invention. In step 810, the ordered heap is initialized. A map with the lowest byte number from the first bitmap segment in each input stream is added to the ordered heap. The first bitmap segment is the bitmap segment starting at the range with the lowest beginning row id.

The next step is step 820. In step 820, the aligned set is initialized by adding to the aligned set the map with the lowest byte number as represented by the top of the ordered heap. This map is moved to the align set. The byte number corresponding to the beginning of the range associated with the map is used to initialize the byte position of the align set. The next map from the same input stream is added to the ordered heap. The ordered heap shall be explained in more detail. Control then passes to step 830.

In step 830, a determination is made of whether the byte position matches the byte number representing the beginning of the range associated with map at the top of the heap. If the determination made is the byte position matches the byte number representing the beginning of the range associated with map at the top of the heap, then control passes to step 840.

In step 840, the map with the lowest byte number as represented by the top of the ordered heap is moved to the align set. The next map from the respective input stream is added to the ordered heap. The number of operations required to add the map is order log n, where n is the number of input streams being ORed. When the map moved to the align set is not the last map in its bitmap segment, the replacement map is found in the same bitmap segment. When the map moved to the aligned set is the last map in its bitmap segment, then the replacement map is the first map in the next bitmap segment in the input stream.

When the map moved to the align set represents the last map in the last bitmap segment in the input stream, then no replacement map is moved into the ordered heap. Eventually the map representing the last map of all the input streams will be moved to the align set. When this event occurs, the ordered heap is empty. After step 840, control then passes to step 830.

In step 830, if the determination made is that the byte position does not match the byte number representing the beginning of the range associated with the map at the top of the heap, then control passes to step 834.

In step 834, the top of the ordered heap is used to establish the upper bound. If the ordered heap is empty, then no upper bound is established.

In step 860, one embodiment of the invention iterates through each member of the alignment set ORing the bytes corresponding to the byte position. The OR result is stored in a resulting bitmap in manner that associates the result with the range represented by the byte number. For example, the OR result may combined with an OR result from a previous iteration. Gaps may be inserted between the two results to maintain the result's positional relationship with its respective range of row ids. The combined results may be stored in a bitmap segment in a resulting bitmap. In alternate embodiments, these bitmap segments are compressed.

While iterating through each member of the aligned set, the last map for that member may be encountered. When this occurs the member is removed before continuing on to the next step. Finally, the byte position is shifted forward. Control then passes to step 870.

In step 870, a determination is made of whether there are any more members in the align set. If there are more members, then control passes to step 880.

In step 880, a determination is made of whether the byte position has reached the upper bound. If the byte is not positioned at the upper bound, then control returns to 860 for generation of a result for the byte position. When there is no upper bound, there is no upper bound to reach. This state is the equivalent of the byte position not being positioned at the upper bound.

If the determination in step 880 is that upper bound has been reached, then there is member from the ordered heap to add to the align set. Control then passes to step 840.

If the determination in step 870 is that there are no members left in the aligned set, then control passes to step 890. In step 890, a determination is made of whether there are any more members in the ordered heap. If there are members in the ordered heap, then control passes to step 820 for re-initialization of the ordered heap.

If the determination in step 890 is that there are no more members in the ordered heap, then performance of the steps ceases.

Illustration of ORing Bitmap Streams

The input streams in FIG. 7 are used to illustrate the operation of the steps in FIG. 8. For the purposes of this illustration, input stream 720 is herein referred to as input 1, input stream 740 is herein referred to input 2, input stream 760 is herein referred to as input 3.

In step 810, the ordered heap is initialized. The first map in each of the input streams is added to the ordered heap. For input 1, the member map added to the ordered heap is the map beginning at byte number 0. For input 3, the member map added to the ordered heap is also the map beginning at byte number 0. For input 2, the member map added to the ordered heap is the map beginning at byte number 2. Control then passes to step 820.

In step 820, the aligned set is initialized by adding the member at the top of the ordered heap, which according to one embodiment of the invention is the map from input 1 starting at byte number 0. The byte number representing the beginning the map, byte number 0, establishes the initial byte position of the aligned set. This map is added to the aligned set. The next map from input 1 is then inserted into the ordered heap. This map is the map beginning at byte number 4. Control then passes to step 830.

In step 830, the determination made is that there is a map at the top of the ordered heap starting at the byte position. Control then passes to step 840. The map at the top of the ordered heap is the map in input 3 starting at byte number 0. That map is added to the aligned set, and replaced in the ordered heap by the map in input 3 starting at byte number 5. Control then passes to step 830.

At step 830, the maps in the ordered heap are the map starting in byte number 4 in input number 1, the map starting at byte number 2 in input 2, and the map starting at byte number 5, in input 3. Because none of these start at the byte position 0, control passes to step 834.

In step 834, the byte number corresponding to beginning of the map at top of heap is used to establish the upper bound. The map at the top of heap is the map starting at byte number 2 in input 2. Thus byte number 2 is used to establish the upper bound. Control then passes to step 860.

In step 860, each map in the aligned set is iterated. At this point, the map in input 1 and the map in input 3 starting at the byte position 0 are the members of the aligned set. The bytes in the maps at byte number 0 are ORed to generate a result and stored in a resulting bitmap. The map in input 3 is removed as a member of the aligned set because that map's end has been reached. The byte position is shifted forward to 1. Control then passes to step 870.

In step 870, the determination made is that there is a member in the aligned set, so control passes to step 880. In step 880, the determination made is that the upper bound has not been reached. The byte position is 1, which is less than 2, the upper bound. Control then returns to step 860.

In step 860, the aligned set has only one member, the map in input 1 overlapping byte number 1. An OR is generated and stored for byte number 1. The byte position is shifted forward to 2. Control passes to step 870. Because there is a member in the aligned set, control passes to step 880.

In step 880, the determination made is that the upper bound has been reached. The byte position is 2, which equals the upper bound. Control then passes to step 840.

In step 840, the map at the top of the heap, which had been used to establish the upper bound, is added to the aligned set. The map at the top of the ordered heap is the map in input 2 starting at byte number 2. That map is added to the aligned set, and replaced in ordered heap by the next map in input 2, the map starting at byte number 5. Control then passes to step 830.

At step 830, the maps in the ordered heap are the map starting in byte number 4 in input number 1, the map starting at byte number 5 in input 2, and the map starting at byte number 5, in input 3. The map at the top of ordered heap is the map starting at byte number 4. The top byte position in the heap, 4, does not equal the byte position of the aligned set, 2. Control passes to step 834. In step 834 the beginning of the map at the top of the heap, the map in input 1 starting at byte number 4 is used to establish the upper bound. Control passes to step 860.

In step 860, each map in the aligned set is iterated. At this point, the map in input 1 and the map in input 2 overlapping the byte position 2 are the members of the aligned set. The bytes in the maps at byte number 2 are ORed to generate a result and stored in a resulting bitmap. The map in input 1 is removed as a member of the aligned set because that map's end has been reached. The byte position is shifted forward to byte number 3. Control then passes to step 870.

In step 870, the determination made is that there is a member in the aligned set, so control passes to step 880. In step 880, the determination made is that the upper bound has not been reached. The byte position is 3, which is less than 4, the upper bound. Control then passes to step 860.

In step 860, the aligned set has only one member, the map in input 2 overlapping byte number 3, the byte position. An OR is generated and stored for byte number 3. This map is then removed as a member of the aligned set because that map's end has been reached. Removing this map leaves no members in the aligned set. The byte position is shifted forward to byte number 4. Control passes to step 870.

In step 870, the determination made is that there is no member in the aligned set. So control passes to step 890. In step 890, the determination made is that there are members in the ordered heap so control passes to step 820.

In step 820, the aligned set is re-initialized. The top of the ordered heap is represented by the map in input 1 beginning at 4. This map is moved to the aligned set. It is replaced in the order heap by the map in input 1 beginning at byte number 15. The map just moved to the aligned set was the last map in its bitmap segment. So the map added to the ordered heap was the first map in bitmap segment 726. Control passes to step 830.

In step 830 at this point, the maps in the ordered heap are the map starting in byte number 15 in input 1, the map starting at byte number 5 in input 2, and the map starting at byte number 5, in input 3. According to an embodiment of the invention, the top of the ordered heap is the map in input 2 starting at byte number 5. Because this map begins after the byte position 4, control passes to step 834. In step 834, the beginning of the map at the top of the heap, the map in input 2 starting at byte number 5 is used to establish the upper bound. Control passes to step 860.

In step 860, the aligned set has only one member, the map in input 1 starting at byte number 4, the byte position. An OR is generated and stored for a range represented by byte number 4. The byte position is shifted forward to byte number 5. Control passes to step 870. Because there is a member in the aligned set, control passes to step 880. Because the byte position equals the upper bound, which is 5, control passes to step 840.

In step 840, the map at the top of the heap, which had been used to establish the upper bound, is added to the aligned set. The map at the top of the ordered heap is the map in input 2 starting at byte number 5. That map is added to the aligned set. However, it is not replaced in the ordered heap. The map was the last map in its bitmap segment. No bitmap segment follows in input 2, thus no map follows. The ordered heap is reduced to two members. The member at the top of the order heap is the map starting at byte number 5 in input 3.

Control passes to step 830. Because the byte position equals the beginning of the map at the top of the ordered heap, the map beginning at byte number 5 in input 3, control returns to step 840. The map at the top of ordered heap is moved to the aligned set. It not replaced because no map follows the map just moved to the aligned set in the input 3. At this point, the ordered heap only contains the one member at the top, which is the map starting at byte number 5 in input 1.

Eventually control passes to step 860 after generating the result corresponding to byte number 5 and removing the map in input 3 overlapping byte number 5. The steps are further repeated until step 870 is reached after the map in input 2 overlapping the byte number 12 is removed in step 830. Because there are no more members in the aligned set, control passes to step 890. In step 890, the determination is made is that the ordered heap is not empty, so control passes to step 820.

In step 820, the member at the top of the heap also represents the last member of the ordered heap. After moving the map in input 1 beginning at byte number 15, there are no more bitmaps segments left in input 1. No replacement member is added to the ordered heap, so the ordered heap is empty.

Eventually, control passes to step 880 after the result corresponding to byte number 15 is generated. In step 880, the determination is that the upper bound has not been reached because there is no upper bound.

Steps 860 through 880 are repeated until eventually control passes to step 870 right after the map in input 1 overlapping byte number 18 is removed. There are no more members in the aligned set. The byte position has just been shifted forward to 19. In step 870, control passes to step 890 because there are no members in the aligned set.

In step 890, the determination made is that there are no more members in the ordered heap. The input streams contain no more maps to OR. Performance of the steps ends.

Performing Set Minus on Bitmap Streams

An example of a set minus operation is an ANDing of bitmaps where one bitmap represents one condition and the other represents the negation of another condition. An example of a set minus operation would be the condition STATE="CA" ANDed with the condition AGE≠13. AGE≠13 is the negation of AGE=13. A bitmap representing AGE≠13 could be generated by taking the 1's complement of the bitmap which represents the condition AGE=13. This bitmap could then be ANDed with the bitmap representing the condition STATE="CA".

Exemplary Bitmap Streams for Set Minus

Figure 9A:
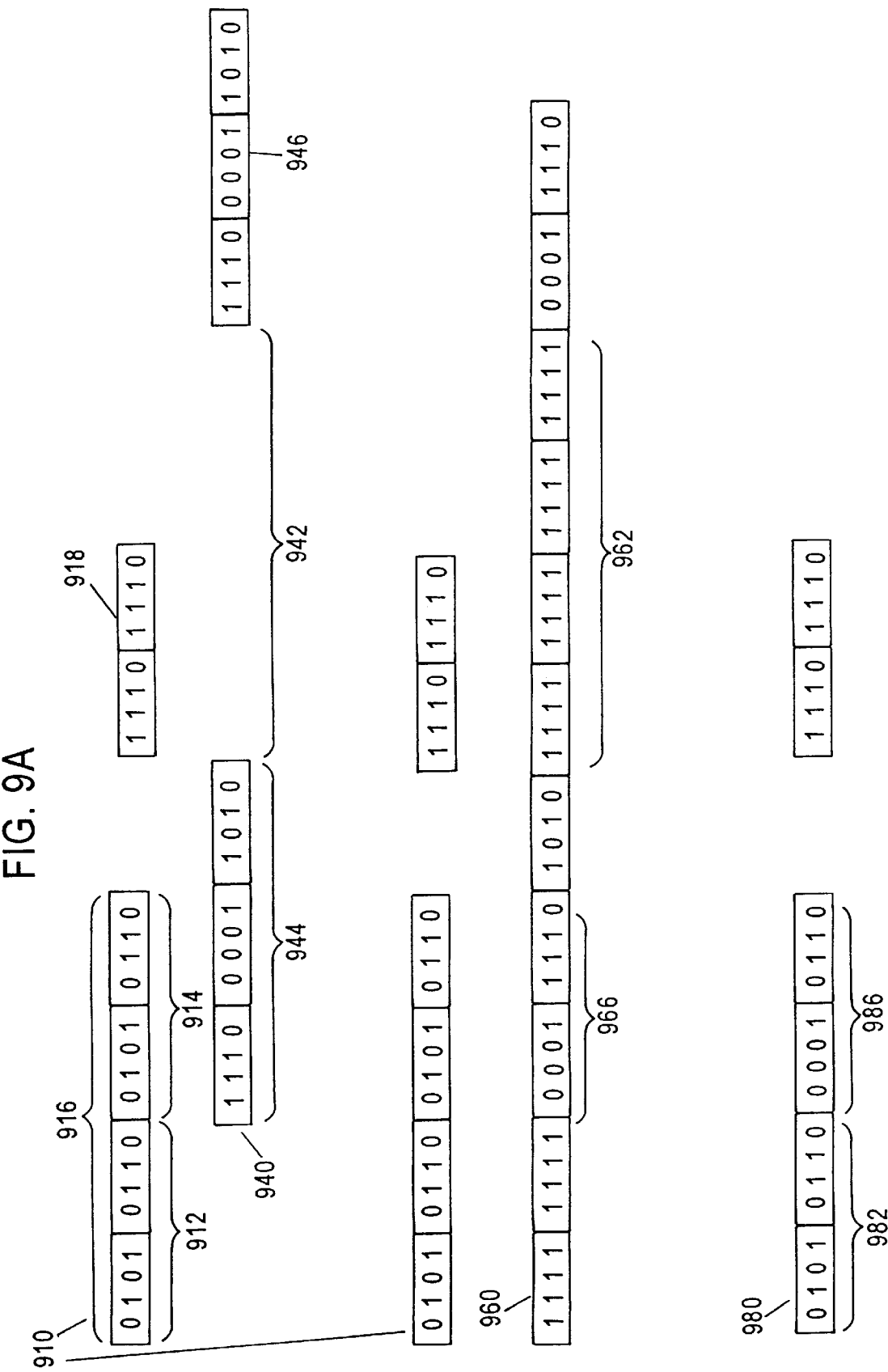
FIG. 9A show bitmap streams on which a set minus operation may be performed.

FIG. 9A contains bitmap streams used to illustrate the set minus operation by an embodiment of the invention. FIG. 9A shows a portion of bitmap stream 910 and bitmap stream 940 aligned according to row id. The bitmap stream representing the condition which is to be negated, bitmap stream 940, is herein referred to as the subtrahend. The bitmap stream being ANDed with the subtrahend, bitmap stream 910, is herein referred to as the minuend.

Bitmap 960 represents the 1's complement of a portion of the subtrahend, bitmap stream 940. Bitmap 980 represents the set minus result of a portion of the minuend and the subtrahend. In bitmap 960, interstitial gaps in the subtrahend, bitmap stream 940, are represented by corresponding contiguous bytes set to 1. For example, interstitial gap 942 is represented by bytes 962, which contain bits all set to 1. The bytes shown in FIG. 9A are 4 bit bytes. Alternative embodiments of the invention use other byte sizes.

Generating Set Minus Results

An embodiment of the invention takes advantage of inherent characteristics of performing a set minus operation between the minuend and the subtrahend. The first inherent characteristic is that for the ranges in which the minuend is not overlapped by a map in the subtrahend, the set minus result for the non-overlapped range is identical to the minuend bitmap. FIG. 9A illustrates this characteristic. In resulting bitmap 980, bytes 982 are identical to bytes 912 in bitmap stream 910, the minuend. The reason for this is that the initial gap in bitmap stream 940, the subtrahend, is represented by bytes 962, which has all bits set to one. The result of ANDing 1 with any value is that value.

The second inherent characteristic is that for the gaps in the minuend map, the set minus result for the corresponding range is always bytes of 0. The reason for this characteristic is that set minusing 0 with any other value is always 0. Consequently, the portions of the subtrahend corresponding to the gaps of the minuend bitmap are ignored.

An embodiment of this invention takes advantage of these inherent characteristics to efficiently generate set minus results. The ranges of the minuend not overlapped by the subtrahend are established as the set minus result for these ranges. Only the portions of the minuend overlapped by the subtrahend require further work. For these overlapped ranges, an embodiment of the invention forms the 1's complement of the subtrahend and ANDs the 1's compliment with the overlapped portion of the minuend bitmap.

The invention achieves its efficiency by ignoring portions of the subtrahend. The gaps in the subtrahend are ignored, and the ranges of the subtrahend corresponding to the gaps of the minuend are ignored.

Steps Generating Set Minus for Bitmap Streams

Figure 10:
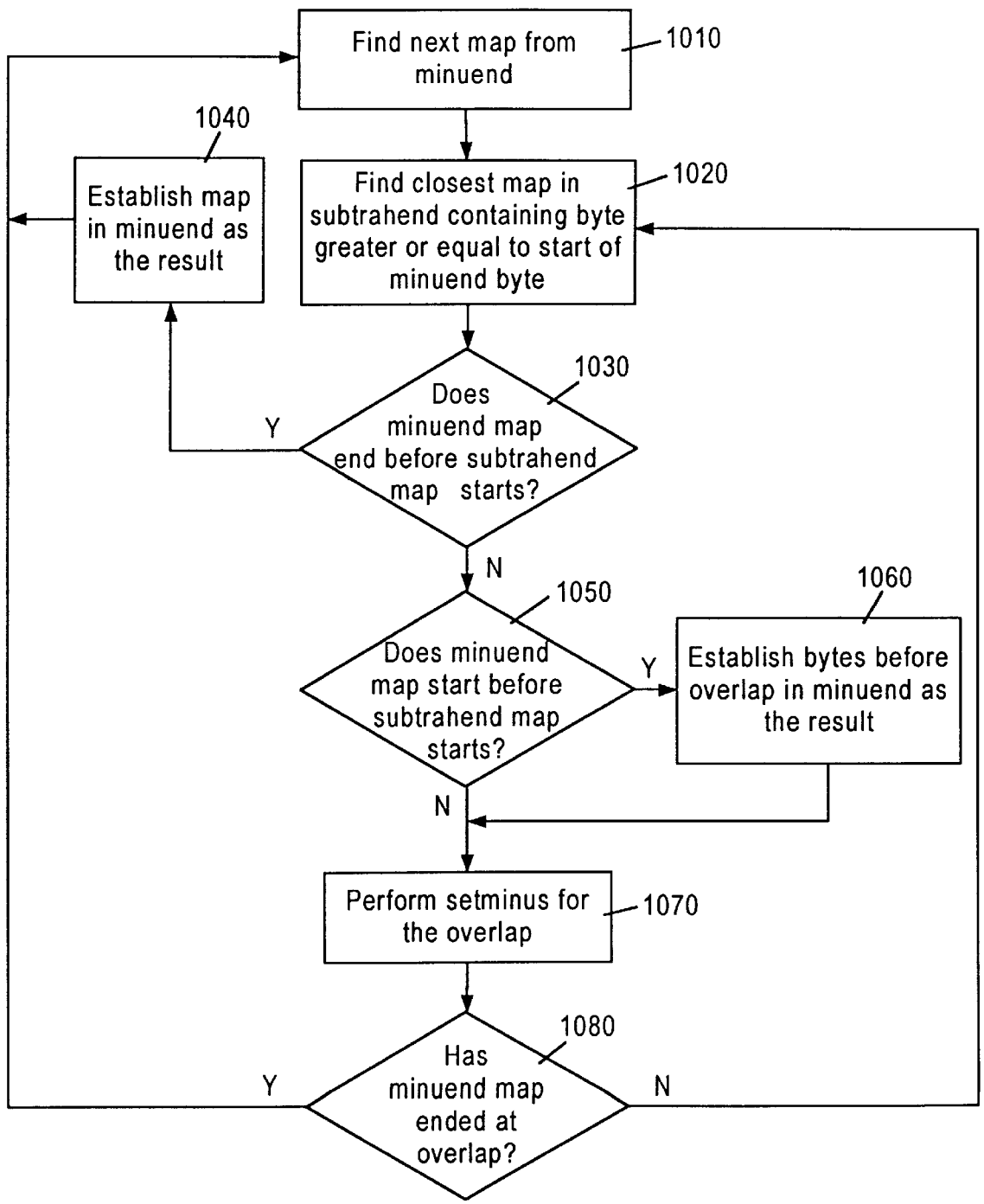
FIG. 10 shows the steps performed by an embodiment of the invention to perform a set minus operation.

FIG. 10 shows the steps performed by an embodiment of the invention to generate the set minus result for a set of bitmap streams. In step 1010, the next map in the subtrahend is found. Control then passes to step 1020.

In step 1020, an embodiment of the invention finds the first map in the subtrahend with a byte corresponding to a range greater or equal to the beginning of the map in the minuend. This map is referred to as the closest map. At this point one of three cases may occur. FIG. 9B shows maps used to demonstrate the three cases.

FIG. 9B shows pairs of maps from a minuend and a subtrahend. Exemplary pair of maps 958 are maps from a bitmap stream depicted in aligned form according to row id. Map 952 is from a minuend and map 954 is from a subtrahend. All pairs of maps from a minuend and a subtrahend are depicted in the same manner.

The first case is that no map from the subtrahend overlaps the map from the minuend. Pair of maps 920 illustrates this case. In this case the, the map from the subtrahend represents by itself the result of the set minus operation.

In the second case, the maps overlap after the beginning of the map from the minuend. Pairs of map 930 demonstrate this case. In this case the, the portion of the map from the subtrahend preceding the overlap represents by itself the result of the set minus operation. The result corresponding the remainder of the map in the minuend overlapped by the subtrahend is based on the set minus operation between the overlapped portions of the maps in the minuend and the subtrahend. This result is formed by taking the 1's compliment of overlapped portion of the map from the subtrahend and ANDing it with the corresponding portion of the map from the minuend.

In the third case, the overlap begins where the map from the minuend begins. This case is represented by pairs of map 950. The result corresponding to the overlap is generated in the manner previously explained in case 2.

After performance of step 1020, control passes to step 1030. In step 1030, a determination is made of whether the map in the minuend ends before the closest map from the subtrahend. If the map in minuend ends before the closest map, then the maps do not overlap. Control passes to step 1040. In step 1040, a result is generated and stored in a resulting bitmap. The result is generated by establishing the map from the minuend as the set minus result. When necessary to maintain a results positional relationship to the row ids, gaps are prefixed to the map from the minuend.

If the determination in step 1030 is that minuend does not end before the closest map in the subtrahend, then the maps must overlap. Control passes to step 1050.

In step 1050, a determination is made of whether the closest map starts after the map from the minuend. If the closest map does start after the map from the minuend, then the overlap starts after the beginning of the map from the minuend. Control then passes to step 1060.

In step 1060, the non-overlapped portion of the of map from the minuend preceding the overlap is established as the result of the set minus. The result is generated in the manner as described in step 1040. Control passes to step 1070.

In step 1070, the result for the overlap between the map from the minuend and the closest map from the subtrahend is generated and stored in a resulting bitmap. The result corresponding to an overlap is formed by ANDing the 1's compliment of overlapped portion of the closest map with the corresponding portion of the map from the minuend. When necessary to maintain a results positional relationship to the row ids, prefix gaps are added.

In step 1080, a determination is made of whether the map from the minuend has ended. If the map from the minuend has ended, control passes to step 1010 to find the next map in the minuend. Otherwise, control passes to step 1020, to find the next closest map from the subtrahend. This map may overlap a portion of the map from the minuend.

When no next map is found in the minuend in step 1010, performance of the steps ends. The resulting bitmap formed during performance of the steps can be used in subsequent operations, including logical operations.

Illustration of Generating Set Minus for a Bitmap Stream

FIG. 9A shows bitmap streams that are used to illustrate the operation of the steps of FIG. 10. For purposes of illustration, FIG. 9A shows all the maps in bitmap stream 910 and bitmap stream 940. Bitmap stream 910 is the minuend and bitmap stream 940 is the subtrahend.

In step 1010, map 916 is found as the next map in the minuend. Control passes to step 1020. In step 1020, map 944 is found as the closest map in the subtrahend because map 944 is the first map in the subtrahend with a byte corresponding to a range starting at or after the beginning of the map in the minuend, map 916. Control passes to step 1030.

In step 1030, the determination made is that the map from the minuend, map 916, does not end before the closest map 944. Therefore the maps overlap. Control passes to step 1050.

In step 1050, the determination made is that the map from the minuend, map 916, starts before the closest map, map 944. Control passes to step 1060. In step 1060, the unoverlapped portion, bytes 912, is established as the result representing the set minus for the portion of the minuend and the subtrahend corresponding to the range of row ids of the unoverlapped portion, bytes 912. The result is stored in a resulting bitmap. Control passes to step 1070.

In step 1070, a set minus operation is performed between the overlapped portion, bytes 914, and the corresponding portion of map 944. A 1's compliment of the corresponding portion of map 944 is generated and set minused with the overlapped portion of the map in the minuend, bytes 914. The result is stored in a resulting bitmap. Control passes to step 1080.

In step 1080, the determination made is that the map from the minuend, map 916, ends at the overlap. Control then passes to step 1010.

In step 1010, the next map found in the minuend is map 918. Control passes to step 1020. In step 1020, map 946 is found as the closest map in the subtrahend because map 946 is the first map in the subtrahend with a byte corresponding to a range starting at or after the beginning of the map in the minuend, map 918. Control passes to step 1030.

In step 1030, the determination made is that the map from the minuend, map 918, ends before the closest map, map 946, begins. Control then passes to step 1040. In step 1040, the map in the minuend, map 918, is established as the result representing the set minus corresponding to the range of row ids of map 918. The result is stored in a resulting bitmap. Control passes to step 1010.

In step 1010, no next map in the minuend is found. Performance of the steps ceases. The resulting bitmap can be used in subsequent operations, include logical operations.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of combining a plurality of bitmaps to generate a resulting bitmap that represents the AND operation between said plurality of bitmaps, the method comprising the steps of:

A) searching said plurality of bitmaps for a first set of overlapping bitmap segments, wherein each bitmap segment from said plurality of bitmaps is associated with a range, wherein each range associated with each bitmap segment of said first set of overlapping bitmap segments overlaps with the ranges associated with all other bitmap segments in said first set of overlapping bitmap segments;

B) generating a first result based on said first set, wherein said first result is representative of a bitwise AND of said plurality of bitmaps for a range shared by all bitmap segments of said first set of overlapping bitmap segments; and C) storing said first result in said resulting bitmap.

2. The method of claim 1, further including the steps of:

D) searching a plurality of bitmaps for a next set of overlapping bitmap segments, wherein each range associated with each bitmap segment of said next set of overlapping bitmap segments overlaps with the ranges associated with all other bitmap segments in said next set of overlapping bitmap segments;

E) generating a next result based on said next set of overlapping bitmap segments, wherein said next result is representative of a bitwise AND of said plurality of bitmaps for a range shared by all bitmap segments of said next set of overlapping bitmap segments;

F) storing said next result in said resulting bitmap; and

G) repeating the steps (D) through (F) until said plurality of bitmaps do not contain another next set of overlapping bitmap segments.

3. The method of claim 1, wherein the step of searching said plurality of bitmaps includes searching at least three bitmaps.

4. The method of claim 1, further including the steps of:

establishing a tentative point of alignment for said first set of overlapping bitmap segments, said tentative point of alignment corresponding to the beginning of a range associated with a map from a particular bitmap segment from said set of overlapping bitmap segments;

determining whether each remaining bitmap segment from said first set of overlapping bitmap segments includes a map associated with a range that overlaps said tentative point of alignment; and if each remaining bitmap segment from said first set of overlapping bitmap segments includes a map associated with a range that overlaps said tentative point of alignment, then generating a result representative of a bitwise AND between said plurality of bitmaps for a range having a beginning at said tentative point of alignment.

5. The method of claim 4, wherein the step determining whether each remaining bitmap segment from said set of overlapping bitmap segments includes a map further includes inspecting each remaining bitmap segment in an order that corresponds to the sparseness of said remaining bitmap segment.

6. The method of claim 4, wherein the step of generating a result representative of a bitwise AND between said plurality of bitmaps for a range having a beginning at said tentative point of alignment further includes:

finding a minimum map beginning at said tentative point of alignment, wherein each of said set of overlapping bitmap segments contains a map completely overlapping the range associated with said minimum map; and generating a result representative of a bitwise AND between said plurality of bitmaps for a range having a beginning at said tentative point of alignment.

7. The method of claim 4, further including establishing the end of the range associated with said minimum map as a next tentative point of alignment.

8. A method of combining a plurality of bitmaps to generate a resulting bitmap representing the OR operation between said plurality of bitmaps, the method comprising the steps of:

establishing an aligned set of bitmap segments from said plurality of said bitmaps, wherein said aligned set is associated with an alignment position, wherein said alignment position is associated with a range, wherein each member of said aligned set contains a map overlapping said alignment position;

performing a bitwise OR operation of maps from said members of said aligned set that overlap said alignment position to generate a first result; and establishing said first result as the result representing the bitwise OR operation between said plurality of bitmaps for the range corresponding to said aligned position.

9. The method of claim 8, wherein the step of establishing an aligned set includes establishing an aligned set of bitmap segments from a set of at least three bitmaps.

10. The method of claim 8, further including the step of:

incrementing said aligned position; and after incrementing said aligned position:

adding to said aligned set nonmember bitmap segments with maps overlapping said aligned position, and removing from said aligned set members of said aligned set that do not contain maps overlapping said aligned position.

11. The method of claim 10, wherein:

said aligned set is associated with an upper bound, said upper bound being the beginning of the next lowest range following said alignment position that is associated with any map from said plurality of bitmaps; and the step of adding to said aligned set further includes adding to said aligned set when said aligned position corresponds to said upper bound.

12. The method of claim 11, wherein:

said aligned set is associated with an upper bound, said upper bound being the beginning of the next lowest range following said alignment position that is associated with any map from said plurality of bitmaps; and the method further includes the of step of if said aligned set contains no members, then incrementing said aligned position to said upper bound.

13. A method of combining a plurality of bitmaps to generate a resulting bitmap representing a SET MINUS operation between said plurality of bitmaps, the method comprising the steps of:

establishing one bitmap of said plurality of bitmaps as a minuend bitmap;

establishing another bitmap from said plurality of bitmaps as a subtrahend bitmap;

finding one or more portions of said minuend bitmap that independently represent a SET MINUS operation between said minuend bitmap and said subtrahend bitmap for one or more ranges corresponding to said one or more portions; and establishing said one or more portions as representative of said SET MINUS operation for the one or more ranges corresponding to said one or more portions.

14. The method of claim 13, wherein the step of finding includes finding a portion of said minuend bitmap corresponding to a gap in said subtrahend bitmap.

15. The method of claim 13, wherein the step of finding includes finding a portion in said minuend bitmap corresponding to a gap in said minuend bitmap.

16. The method of claim 13, further including the step establishing as representative of a SET MINUS operation for a particular range a result of a bitwise AND operation between a portion of said minuend corresponding to said particular range and a one's compliment of a portion of said subtrahend corresponding to said particular range.

17. A computer-readable medium carrying one or more sequences of one or more instructions for combining a plurality of bitmaps to generate a resulting bitmap that represents the AND operation between said plurality of bitmaps, wherein the execution of the one or more sequences of the one or more instructions causes the one or more processors to perform the steps of:

A) searching said plurality of bitmaps for a first set of overlapping bitmapsegments, wherein each bitmap segment from said plurality of bitmaps is associated with a range, wherein each range associated with each bitmap segment of said first set of overlapping bitmap segments overlaps with the ranges associated with all other bitmap segments in said first set of overlapping bitmap segments;

B) generating a first result based on said first set, wherein said first result is representative of a bitwise AND of said plurality of bitmaps for a range shared by all bitmap segments of said first set of overlapping bitmap segments; and C) storing said first result in said resulting bitmap.

18. The method of claim 17, wherein the step of searching said plurality of bitmaps includes searching at least three bitmaps.

19. A computer-readable medium carrying one or more sequences of one or more instructions for combining a plurality of bitmaps to generate a resulting bitmap representing the OR operation between said plurality of bitmaps, wherein the execution of the one or more sequences of the one or more instructions causes the one or more processors to perform the steps of:

establishing an aligned set of bitmap segments from said plurality of said bitmaps, wherein said aligned set is associated with an alignment position, wherein said alignment position is associated with a range, wherein each member of said aligned set contains a map overlapping said alignment position;

performing a bitwise OR operation of maps from said members of said aligned set that overlap said alignment position to generate a first result; and establishing said first result as the result representing the bitwise OR operation between said plurality of bitmaps for the range corresponding to said aligned position.

20. The computer-readable media of claim 19, wherein the step of establishing an aligned set includes establishing an aligned set of bitmap segments from a set of at least three bitmaps.

21. The computer-readable media of claim 19, further including sequences of instructions for performing the steps of:

incrementing said aligned position; and after incrementing said aligned position:
adding to said aligned set nonmember bitmap segments with maps overlapping said aligned position, and
removing from said aligned set members of said aligned set that do not contain maps overlapping said aligned position.

22. The computer-readable media of claim 21, wherein:

said aligned set is associated with an upper bound, said upper bound being the beginning of the next lowest range following said alignment position that is associated with any map from said plurality of bitmaps; and the step of adding to said aligned set further includes adding to said aligned set when said aligned position corresponds to said upper bound.

23. The computer-readable media of claim 22, wherein:

said aligned set is associated with an upper bound, said upper bound being the beginning of the next lowest range following said alignment position that is associated with any map from said plurality of bitmaps; and the computer-readable media further includes sequences of instructions for performing the step of if said aligned set contains no members, then incrementing said aligned position to said upper bound.

24. The computer-readable medium of claim 19, further including sequences of instructions for performing the steps of:

D) searching a plurality of bitmaps for a next set of overlapping bitmap segments, wherein each range associated with each bitmap segment of said next set of overlapping bitmap segments overlaps with the ranges associated with all other bitmap segments in said next set of overlapping bitmap segments;

E) generating a next result based on said next set of overlapping bitmap segments, wherein said next result is representative of a bitwise AND of said plurality of bitmaps for a range shared by all bitmap segments of said next set of overlapping bitmap segments;

F) storing said next result in said resulting bitmap; and

G) repeating the steps (D) through (F) until said plurality of bitmaps do not contain another next set of overlapping bitmap segments.

25. The computer-readable medium of claim 19, further including sequences of instructions for performing the steps of:

establishing a tentative point of alignment for said first set of overlapping bitmap segments, said tentative point of alignment corresponding to the beginning of a range associated with a map from a particular bitmap segment from said set of overlapping bitmap segments;

determining whether each remaining bitmap segment from said first set of overlapping bitmap segments includes a map associated with a range that overlaps said tentative point of alignment; and if each remaining bitmap segment from said first set of overlapping bitmap segments includes a map associated with a range that overlaps said tentative point of alignment, then generating a result representative of a bitwise AND between said plurality of bitmaps for a range having a beginning at said tentative point of alignment.

26. The computer-readable medium of claim 25, wherein the step of determining whether each remaining bitmap segment from said set of overlapping bitmap segments includes a map further includes inspecting each remaining bitmap segment in an order that corresponds to the sparseness of said remaining bitmap segment.

27. The computer-readable medium of claim 25, wherein the step of generating a result representative of a bitwise AND between said plurality of bitmaps for a range having a beginning at said tentative point of alignment further includes:

finding a minimum map beginning at said tentative point of alignment, wherein each of said set of overlapping bitmap segments contains a map completely overlapping the range associated with said minimum map; and generating a result representative of a bitwise AND between said plurality of bitmaps for a range having a beginning at said tentative point of alignment.

28. The computer-readable medium of claim 25, further including sequences of instructions for performing the step of establishing the end of the range associated with said minimum map as a next tentative point of alignment.

* * * * *

UNITED STATES PATENT AND TRADEMARK OFFICE
CERTIFICATE OF CORRECTION

PATENT NO.   : 6,141,656
DATED        : October 31, 2000
INVENTOR(S)  : Cetin Ozbutun, et al.

It is certified that error appears in the above-identified patent and that said Letters Patent is hereby corrected as shown below:

After line, column 28, please add the following claims:

29. A computer-readable medium carrying one or more sequences of one or more instructions for combining a plurality of bitmaps to generate a resulting bitmap representing a SET MINUS operation between said plurality of bitmaps, the one or more sequences of one or more instructions including instructions which, when executed by one or more processors, cause the one or more processors to perform the steps of:
establishing one bitmap of said plurality of bitmaps as a minuend bitmap;
establishing another bitmap from said plurality of bitmaps as a subtrahend bitmap;
finding one or more portions of said minuend bitmap that independently represent a SET MINUS operation between said minuend bitmap and said subtrahend bitmap for one or more ranges corresponding to said one or more portions; and
establishing said one or more portions as representative of said SET MINUS operation for the one or more ranges corresponding to said one or more portions.

30. The computer-readable medium of Claim 29, wherein the step of finding includes finding a portion of said minuend bitmap corresponding to a gap in said subtrahend bitmap.

31. The computer-readable medium of Claim 29, wherein the step of finding includes finding a portion in said minuend bitmap corresponding to a gap in said minuend bitmap.

32. The computer-readable medium of Claim 29, further including sequences of instructions for performing the step of establishing as representative of a SET MINUS operation for a particular range a result of a bitwise AND operation between a portion of said minuend corresponding to said particular range and a one's compliment of a portion of said subtrahend corresponding to said particular range.

UNITED STATES PATENT AND TRADEMARK OFFICE
CERTIFICATE OF CORRECTION

PATENT NO. : 6,141,656
DATED : October 31, 2000
INVENTOR(S) : Cetin Ozbutun, et al.

It is certified that error appears in the above-identified patent and that said Letters Patent is hereby corrected as shown below:

Column 27,
Line 5, replace "method" with -- computer-readable medium --;
Line 60, replace "19" with -- 17 --; and Column 28,
Line 25, replace "19" with -- 17 --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*